US010547602B2

(12) United States Patent
Asveren

(10) Patent No.: US 10,547,602 B2
(45) Date of Patent: *Jan. 28, 2020

(54) COMMUNICATIONS METHODS AND APPARATUS RELATED TO WEB INITIATED SESSIONS

(71) Applicant: Ribbon Communications Operating Company, Inc., Westford, MA (US)

(72) Inventor: Tolga Asveren, Bordentown, NJ (US)

(73) Assignee: Ribbon Communications Operating Company, Inc., Westford, MA (US)

( * ) Notice: Subject to any disclaimer, the term of this patent is extended or adjusted under 35 U.S.C. 154(b) by 108 days.

This patent is subject to a terminal disclaimer.

(21) Appl. No.: 15/623,026

(22) Filed: Jun. 14, 2017

(65) Prior Publication Data

US 2017/0289261 A1    Oct. 5, 2017

Related U.S. Application Data

(63) Continuation of application No. 13/948,974, filed on Jul. 23, 2013, now Pat. No. 9,736,130.

(Continued)

(51) Int. Cl.
*H04L 29/06* (2006.01)
*H04M 15/00* (2006.01)
(Continued)

(52) U.S. Cl.
CPC .............. *H04L 63/08* (2013.01); *G06F 21/31* (2013.01); *H04L 63/1458* (2013.01);
(Continued)

(58) Field of Classification Search
CPC ..... H04L 67/14; H04L 63/1458; H04L 63/08; H04L 63/0823; H04L 63/123;
(Continued)

(56) References Cited

U.S. PATENT DOCUMENTS 6,161,182 A    12/2000 Nadooshan
6,968,539 B1 *  11/2005 Huang ................. G06F 9/4484
                                                  717/115

(Continued)

OTHER PUBLICATIONS

U.S. Appl. No. 13/948,966, entitled, "Methods and Apparatus Related to Web Initiated Sessions", filed Jul. 23, 2013, Inventor: Tolga Asveren.

*Primary Examiner* — Michael Simitoski
(74) *Attorney, Agent, or Firm* — Straub & Straub; Stephen T. Straub; Michael P. Straub

(57) ABSTRACT

A client device, e.g., a smartphone including a web browser, requests a call authorization token from a web server, e.g., a web page server. The web server, acting on behalf of a company, whose web page is hosted and whose phone corresponds to the called party, screens incoming requests and decides whether or not to issue an authorization token, e.g., a signed token including an encrypted portion. The web server issues a call authorization token and communicate the issued token to the client device. The client device includes the received issued call authorization token in a signal, e.g., a SIP INVITE signal, which it generates and sends to a session border controller (SBC). The session border controller processes the received authorization token and checks the authorization token to validate the received token. The SBC establishes a communications session if the received token passes the validation check.

20 Claims, 18 Drawing Sheets

Related U.S. Application Data

(60) Provisional application No. 61/843,220, filed on Jul. 5, 2013.

(51) Int. Cl.
    *H04M 3/523*     (2006.01)
    *G06F 21/31*     (2013.01)
    *H04L 29/08*     (2006.01)

(52) U.S. Cl.
    CPC .............. *H04L 67/14* (2013.01); *H04M 3/523* (2013.01); *H04M 15/39* (2013.01)

(58) Field of Classification Search
    CPC ... H04L 65/1006; H04M 3/523; H04M 15/39; H04M 2203/2016; H04M 2203/6081; H04M 7/003; G06F 21/31; G06F 21/33
    See application file for complete search history.

(56) References Cited

U.S. PATENT DOCUMENTS

| | | | | |
|---|---|---|---|---|
| 8,201,233 | B2* | 6/2012 | Beaulieu | H04L 9/0844 341/67 |
| 8,601,144 | B1* | 12/2013 | Ryner | G06F 21/45 709/228 |
| 8,695,077 | B1* | 4/2014 | Gerhard | H04L 63/0815 726/8 |
| 8,844,005 | B2* | 9/2014 | Jakobsson | G06F 21/316 726/6 |
| 8,861,692 | B1* | 10/2014 | Phelps | H04M 15/39 370/401 |
| 8,862,754 | B2* | 10/2014 | McGowan | H04L 65/1069 709/229 |
| 9,641,624 | B2* | 5/2017 | Hyotylainen | H04L 67/14 |
| 2001/0038624 | A1 | 11/2001 | Greenberg et al. | |
| 2005/0015719 | A1* | 1/2005 | Marchon | H04L 29/06027 715/202 |
| 2005/0021761 | A1* | 1/2005 | Thomas | H04L 29/06027 709/227 |
| 2005/0132060 | A1 | 6/2005 | Mo et al. | |
| 2006/0277108 | A1 | 12/2006 | Altberg et al. | |
| 2007/0115927 | A1 | 5/2007 | Pearson | |
| 2010/0082977 | A1* | 4/2010 | Boyle | H04L 63/0815 713/158 |
| 2010/0189260 | A1 | 7/2010 | Ramanathan et al. | |
| 2010/0275134 | A1* | 10/2010 | Baker | H04M 3/42068 715/753 |
| 2012/0020351 | A1* | 1/2012 | Booton | H04M 3/38 370/352 |
| 2012/0036364 | A1 | 2/2012 | Yoneda et al. | |
| 2012/0221725 | A1* | 8/2012 | Schroeder, Jr. | G06F 9/468 709/225 |
| 2013/0205386 | A1 | 8/2013 | Thompson | |
| 2014/0245420 | A1* | 8/2014 | Tidwell | H04L 65/40 726/10 |
| 2014/0331060 | A1* | 11/2014 | Hayton | G06F 21/31 713/186 |
| 2015/0074751 | A1 | 3/2015 | Agarwal et al. | |
| 2016/0119314 | A1* | 4/2016 | Uzelac | H04L 63/0807 726/6 |
| 2016/0119315 | A1* | 4/2016 | Uzelac | H04L 63/0807 726/9 |

* cited by examiner

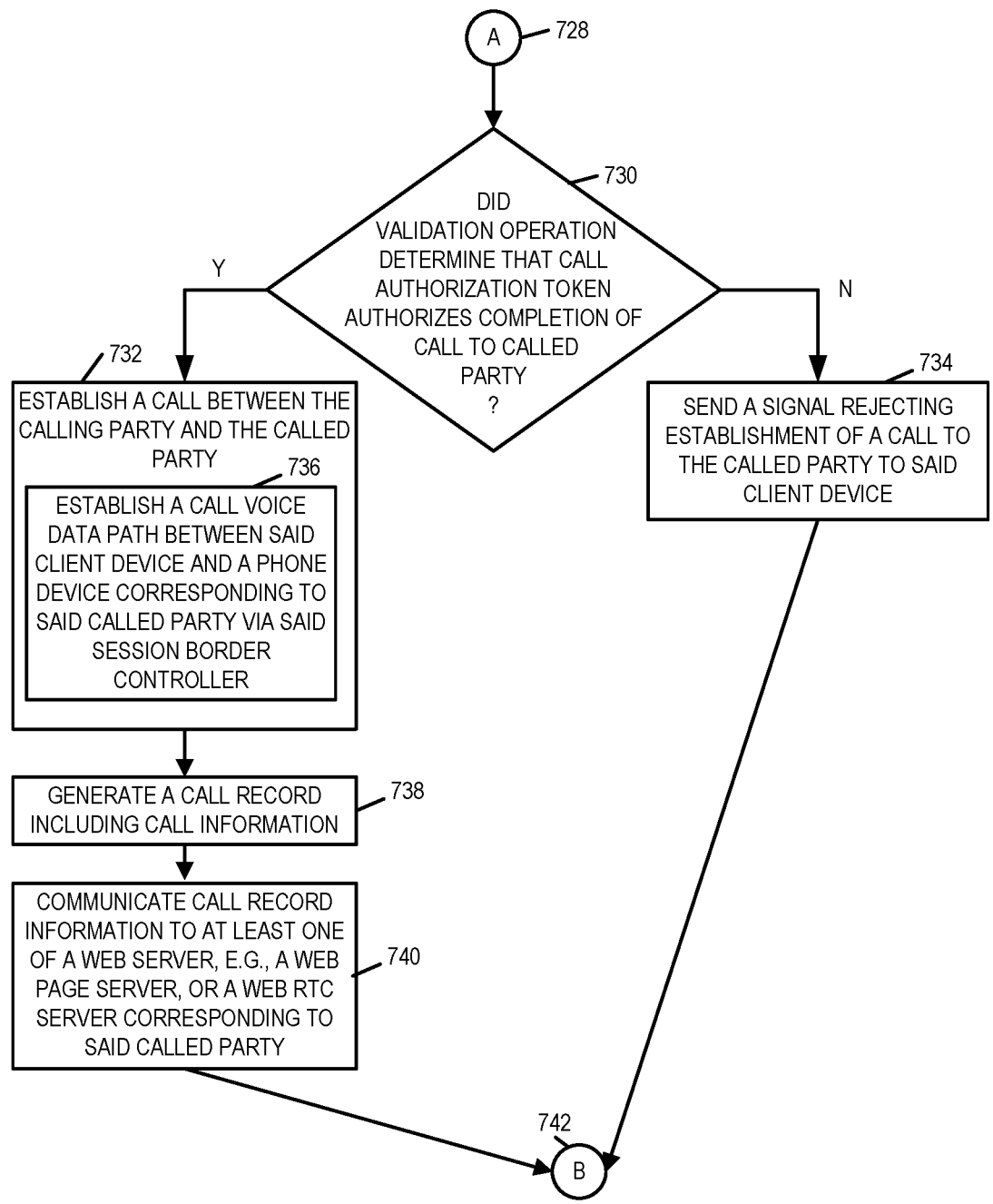

COMMUNICATIONS METHODS AND APPARATUS RELATED TO WEB INITIATED SESSIONS

RELATED APPLICATIONS

The present application is a continuation of U.S. patent application Ser. No. 13/948,974 filed Jul. 23, 2013 which claims the benefit of U.S. Provisional Patent Application Ser. No. 61/843,220 filed Jul. 5, 2013 both of which are hereby expressly incorporated by reference in their entirety.

FIELD

Various embodiments relate to communications sessions initiated via a web browser, and more particularly, to methods and apparatus related to authorization of a communications session.

BACKGROUND

Real-Time Communications in Web browser platform (RTCWeb) allows browsers to initiate real time communication sessions. One use case of this new technology would be browsers accessing legacy Session Initiation Protocol (SIP) world. For example, a company's web page may have a "call customer service" button and this could initiate a SIP session from the browser to the call center.

In the legacy SIP world, a Session Border Controller (SBC) assumes either an access or peering role. In the access role, endpoints/Internet Protocol Private Branch Exchanges (IP-PBXs) perform SIP registration and authorization of the registration by the Registrar is considered by the SBC, provided that the endpoint/IP-PBX is a valid entity. For peering scenarios, usually the Internet Protocol (IP) address of peers is preconfigured or their identity is verified through Transport Layer Security (TLS).

Web initiated real time calls create a new challenge as a SBC could receive SIP session initiation requests from non-registered entities, where SBC does not necessarily know the IP addresses of the devices from which the requests may be received a priori.

There is a need to protect the call center infrastructure in the legacy SIP domain from excessive call rates. This task of protecting the call center is usually is performed by a SBC which interfaces between the SIP domain and legacy telephone domain. It is desirable to apply rate control among legitimate calls and reject other calls directly without considering them for call rate calculation. However, such an approach is call rate control and protecting legacy devices is complicated by the SBC's inability to reliably distinguish between valid call attempts and unauthorized or malicious call attempts based on the IP address of the call initiator given the inability to know the IP addresses of all callers who may initiate a call in real time from a Web application prior to the call being placed.

Thus, new methods and apparatus are need to screen session initiation requests which may be initiated via a web browser. It would be desirable is such methods could avoid the need for a query from an SBC and an authorization entity in response to individual calls since such queries may introduce delays and place loads on the SBC that can be undesirable especially where there are concerns with regard to possibly malicious attaches which may be designed to load the SBC and/or other network elements such as in the case of denial of service attacks.

SUMMARY

Various embodiments are directed to methods and apparatus related to communications sessions which are initiated via input to a web browser. For example, a user device including a web browser may desire to establish a communication session in real time with a company's customer service representative phone, and the user input initiation request may be via a selected button on the company's web page.

In at least some embodiments, a client device, e.g., a smartphone including a web browser or personal computer including a web browser, requests a call authorization token from a web page server in response to a detected user input requesting establishment of a communications session. The authorization token may be requested under control of a Java script or other program running in the web browser or otherwise incorporated into the web browser.

The web page server, acting on behalf of a company, whose web page is hosted and whose call center can be reached through use of the webpage, screens incoming requests and decides whether or not to grant a token in response to the request. The call authorization token, if granted, authorizes a device receiving the token to proceed with a requested call. The authorization token may be, and in some embodiments does, limit the call to a party or device corresponding to the company, e.g., a customer representative of the company. In some embodiments an authorization token includes only encrypted information while in other embodiments the authorization token includes encrypted information and some unencrypted information, e.g., some or all information used in generate the encrypted information. In embodiments where the token does not include all the unencrypted information used as an input to an encryption process used to generated the encrypted portion of the token, security is enhanced since an entity intercepting the communication in only one direction of the communication from the web browser, e.g., running on a client device such as a personal computer or a cell phone, to the web server or from the web server to the web browser will lack the the full set of material, e.g., encrypted token content and unencrypted input used to generate the encrypted content, which is to be supplied to a session border controller. In some embodiments where the authorization token includes only encrypted content or includes encrypted content plus, in unencrypted form, a portion of the input used to generate the encrypted content, the web browser using the token supplies the unencrypted content used as input to generate the encrypted portion of the token, or portion thereof not included in the token, to a session border controller or other device which uses the authorization token in making a decision whether or not to allow a call to proceed. The web browser may, and sometimes does, supply the unencrypted content to a session border control in the same signal, e.g., message, in which an authorization token is provided of the session border controller, but in other embodiments the unencrypted information used to generate the encrypted portion of the token is supplied in a separate signal sent by the web browser to the session border controller where the separate signal sent to the session border controller is different from the signal used to send the authorization token to the session border controller.

Making a decision whether or not to issue a call authorization token may include, for example, checking if the requesting party is a customer or other individual known to the company to which the Web page via which the call request was initiated. Alternatively or in additionally, the requesting party may be requested to provide a response to a request, e.g., a request to enter text displayed on a screen of the user's device, to try and avoid issuing tokens to malicious automatic computer generated requests which may be part of a denial of service attack.

By placing the decision making process on whether a user seeking to initiate a call is legitimate and should be allowed to make a call through the network on the server which provided the web page used to initiate a call, the burden of making a call authorization decision is placed on the entity which is most likely to be knowledgeable about the caller, i.e., the entity whose representative is likely being contacted by the call being initiated and who may have some knowledge about the party initiating the call.

Assuming the web server decides to authorize the call which the party requesting the call authorization token is seeking to initiate, the web page server may, and sometimes does, issue a call authorization token. The web server communicates the issued token to the client device which requested the token. The client device includes the received issued call authorization token in a signal used to initiate a communications session, e.g., a call. The signal can be a SIP signal, e.g., a SIP INVITE signal, which the client device generates and sends to a session border controller (SBC) which participates in the call establishment process. While SIP signaling is used in various embodiments to establish a call, other types of signaling including, e.g., Extensible Messaging and Presence Protocol (XMPP) signaling, may be used to set up the call session depending on the particular embodiment. The SBC, in some embodiments, includes a media proxy, e.g. a media proxy which through which real time communications may be initiated via a web application, e.g., a Web RTC application.

The SBC processes the signal used to initiate a communications session, e.g., the SIP signal, and checks the received authorization token attempt to validate the received token. The SBC rejects a session establishment request if a received token fails a validity check, and may, and sometimes does, establish a communications session if the received token passes the validity checks. The token check may be performed at an early state of the session initiation signaling processing, e.g., SIP signal processing, thereby minimizing allocation of processing and signaling resources by the SBC with regard to call initiation attempts which lack valid authorization tokens.

Assuming an authorization token is validated, the session establishment signaling will be allowed to proceed and the SBC will proceed to establish a call between the web browser of the calling party and a called party, e.g., a customer representative corresponding to the company to which the web page from which the call initiation request was made.

The number and/or duration of calls which are established as a result of received call authorization tokens corresponding to a particular issuing party, e.g., company, may and in some embodiments are tracked with the company in some embodiments being billed for the number of calls which are allowed to proceed based on authorization tokens issued by a server or other device corresponding to the company.

In various embodiments, the authorization token is a signed authorization token signed by the web page server which generated the token. In some embodiments, the token includes an encrypted portion, and the web page server and the SBC include a shared secret which allows the web page server to generate the encrypted portion of the token and the SBC to decrypt the token. In some embodiments the token includes a component supplied by a JavaScript running in the caller's web browser. In at least some embodiments the component provided by the web browser's Java Script is in plain/unencrypted form. The unencrypted information supplied with the encrypted information to the SBC is used for verifying the token in some embodiments. In at least some such embodiments a SBC can decrypt the encrypted information included in the token and compare it to the unencrypted portion included in or supplied with the token to determine if the information communicated by the encrypted portion matches the unencrypted information indicating, e.g., that the token is valid token.

Based on the signature and/or encrypted information in an authorization token, the SBC is able to quickly determine if the token was authorized by an entity authorized to issue such a token and, in many cases, whether a received token was altered prior to presentation to the SBC. Time information and/or a token number, e.g., a sequence number or unique identification number, may be included in the token to reduce the risk of a previously used call authorization token being used for an extended period of time and/or the same token being used to authorize multiple calls. In at least some embodiments a token is allowed to be used once and if the same token is received again it is considered to be invalid and the SBC will not complete the call. This reduces the risk of reply attacks.

An exemplary method of operating a communications device, e.g., a client device including a web browser, in accordance with some embodiments, includes detecting user input indicating selection of a call initiation option corresponding to a web page used to initiate a call to a party, sending a request for a call authorization token to a web server, receiving an issued call authorization token from said web server, and sending a signal to initiate a call, said signal including said call authorization token. An exemplary communications device, e.g., a client device including a web browser, in accordance with some embodiments, includes: a module configured to detect user input indicating selection of a call initiation option corresponding to a web page used to initiate a call to a party; a module configured to send a request for a call authorization token to a web server; a module configured to receive an issued call authorization token from said web server; and a module configured to send a signal to initiate a call, said signal including said call authorization token. An exemplary computer program product for use in a communications device, in accordance with some embodiments, includes: a non-transitory computer readable medium comprising: code for controlling at least one computer to detect user input indicating selection of a call initiation option corresponding to a web page used to initiate a call to a party; code for controlling said at least one computer to send a request for a call authorization token to a web server; code for controlling said at least one computer to receive an issued call authorization token from said web server; and code for controlling said at least one computer to send a signal to initiate a call, said signal including said call authorization token. An exemplary method of operating a session border controller (SBC), e.g., a SBC including a media proxy, in accordance with some embodiments, includes: receiving a call initiation signal including a call authorization token received from a client device including a web browser application via which a caller is initiating a call to a called party, said call authorization token including at least one of encrypted content or a third party signature; performing a validation operation on the call authorization token to determine if it authorizes completion of a call to the called party; and establishing a call between the calling party and called party if said validation operation determines that the call authorization token authorized completion of the call to the called party. An exemplary session border controller, in accordance with some embodiments, includes: a module configured to receive a call initiation signal including a call authorization token received from a client device including a web browser application via which a caller is initiating a call to a called party, said call authorization token including at least one or encrypted content or a third party signature; a module configured to perform a validation operation on the call authorization token to determine if it authorizes completion of a call to the called party; and a module configured to establish a call between the calling party and called party if said validation operation determines that the call authorization token authorized completion of the call to the called party. An exemplary computer program product for use in a session border controller (SBC), in accordance with some embodiments, includes: a non-transitory computer readable medium comprising: code for controlling at least one computer to receive a call initiation signal including a call authorization token received from a client device including a web browser application via which a caller is initiating a call to a called party, said call authorization token including at least one of encrypted content or a third party signature; code for controlling said at least one computer to perform a validation operation on the call authorization token to determine if it authorizes completion of a call to the called party; and code for controlling said at least one computer to establish a call between the calling party and called party if said validation operation determines that the call authorization token authorized completion of the call to the called party.

An exemplary method of operating a web server, e.g., a web page server, in accordance with some embodiments, includes: receiving a request for a call authorization token from a client device executing a web browser in response to user selection of an initiate call web page option presented to a user in a web page; determining whether or not to issue a call authorization token in response to said request; and when it is determined that a call authorization token is to be issued, i) generating, using encryption, the call authorization token, said call authorization token authorizing a control device to establish a call between the client device and a called party device and ii) sending the generated call authorization token to said client device for use in establishing a call with a called party. An exemplary web server, e.g., a web page server, in accordance with some embodiments, includes: a module configured to receive a request for a call authorization token from a client device executing a web browser in response to user selection of an initiate call web page option presented to a user in a web page; a module configured to determine whether or not to issue a call authorization token in response to said request; a module configured to generate, using encryption, the call authorization token, when it is determined that a call authorization token is to be issued, said call authorization token authorizing a control device to establish a call between the client device and a called party device; and a module configured to send the generated call authorization token to said client device for use in establishing a call with a called party. An exemplary computer program product for use in a web server, in accordance with some embodiments, includes: a non-transitory computer readable medium comprising: code for controlling at least one computer to receive a request for a call authorization token from a client device executing a web browser in response to user selection of an initiate call web page option presented to a user in a web page; code for controlling said at least one computer to determine whether or not to issue a call authorization token in response to said request; code for causing said at least one computer to generate, using encryption, the call authorization token when it is determined that a call authorization token is to be issued, said call authorization token authorizing a control device to establish a call between the client device and a called party device; and code for causing said at least one computer to send the generated call authorization token to said client device for use in establishing a call with a called party when it is determined that a call authorization token is to be issued.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

BRIEF DESCRIPTION OF THE FIGURES

FIG. 74 is a first part of a flowchart illustrating a method of operating a session border controller (SBC) in accordance with various embodiments of the present invention.

DETAILED DESCRIPTION

Figure 1:
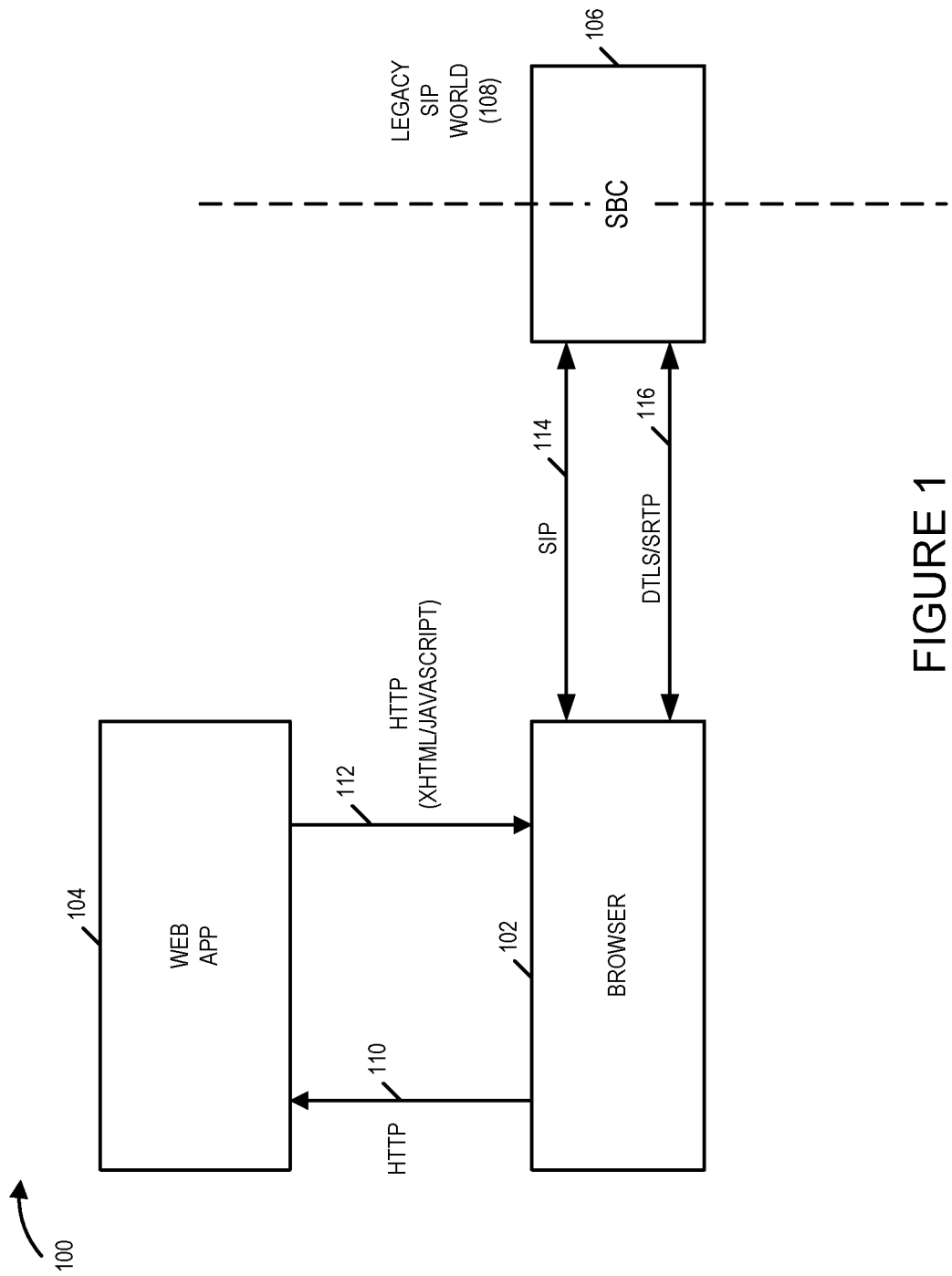
FIG. 1 is a drawing illustrating exemplary signaling in which a browser accesses a SIP domain, e.g., a legacy SIP domain, via a SBC. e.g., for purposes of placing a call to a device in the SIP domain.

FIG. 1 illustrates an exemplary system 100 including a Web Application (App) 104, a Web Browser 102, and a Session Border Controller (SBC) 106. The SBC provides an interface to the legacy SIP world 108. The Web Application 104, may correspond to a company and be part of a web server hosting the company's web page. The Web Browser 102 may reside on a client device, e.g., an user device such as a smartphone including a browser. Browser 102 sends HyperText Transfer Protocol (HTTP) signal 110 to Web App 104 to request the company's webpage. In response Web App 104 sends HTTP (Extensible Hypertext Markup (XHTML)/JavaScript)) signals 112 to browser 102. The browser displays the company's webpage including a "call customer service" button. The user of browser 102 selects the call customer service button which initiates a SIP session from the browser to the call center. SIP signaling 114 and Datagram Transport Level Security/Selectively Reliable Transport Protocol (DTLS/SRTP) signaling occurs between the browser 102 and the SBC 106.

Figure 2:
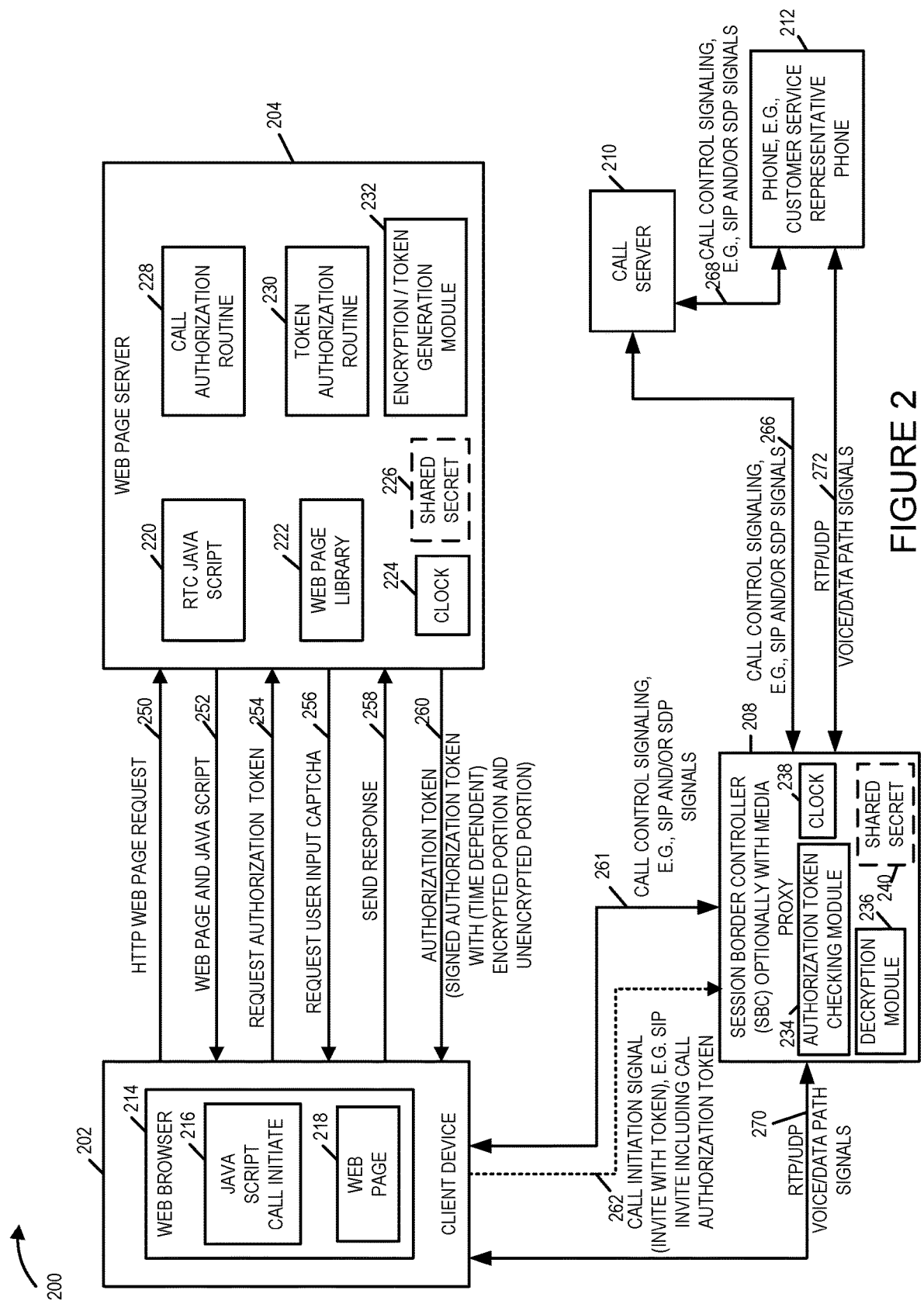
FIG. 2 illustrates an exemplary communications system, in accordance with various exemplary embodiments of the present invention.

FIG. 2 is a drawing of an exemplary communications system 200 in accordance with various exemplary embodiments. Exemplary communications system 200 includes a client device 202, a web page server 204, a session border controller (SBC) 208 optionally including a media proxy, a call server 210, and a phone 212, e.g., a customer service representative phone. The various devices (202, 204 208, 210, 212) are coupled together via wired, fiber optic, and/or wireless links and/or by a combination of wired, fiber optic, and/or wireless links.

Client device 202 includes a web browser 214. Client device 202 is, e.g., one of a stationary personal computer (PC), laptop PC, notebook PC, electronic pad, electronic tablet, cellphone, smartphone, or other device including a web browser. The web browser 214 includes a JavaScript call initiate module 216 and a web page 218.

Web page server 204 includes RTC JavaScript 220, a web page library 222, a clock 224, a call authorization routine 228, a token authorization, e.g., issuance, routine 230, and an encryption/token generation module 232. In some embodiments, web page server 204 includes a shared secret 226.

Session border controller (SBC) 208 includes an authorization token checking module 234, a decryption module 236, and a clock 238. In some embodiments, SBC 208 includes a shared secret 240, e.g., corresponding to shared secret 226 of web page server 204. In some embodiments shared secret 226 is the same as shared secret 240.

Client device 202 generates and sends HTTP web page request 250 to web page server 204. Web page server 204 receives request 250 and, in response, generates and sends web page and JavaScript signals 252 to the client device 202. The communicated web page communicated in signals 252 is one of the web pages included in web page library 222 and corresponds to the particular web page which is being requested in signal 250. The Web page communicated in signals 252 is loaded in the client device 202 and stored as web page 218. Communicated JavaScript signals included in signals 252 include JavaScript call initiate module 216 which is loaded and stored in client device 214. JavaScript call initiate module 216 is one of the JavaScripts included in RTC JavaScripts, and corresponds to webpage 218.

The client device 202 generates and sends a request for an authorization token 254 to web page server 204, e.g., in response to a detection of user input selecting a call button the web page 218. In some embodiments, the request for authorization token signal 254 includes a random number. The web page server 204 receives the request for a call authorization token 254 and, in response, generates and sends a request for user input captcha 256. The client device 202 receives the request for user input captcha 256, and sends response 258 communicating the user input captcha input from the operator of client device 202. Web page server 204 receives and processes the response signal 258. While use of a CAPTCHA is described in the example, this is optional and may not be used in all embodiments. The Web page server 204 can, depending on the embodiment, grant an authorization for the call and provide a token without any checks if so desired by the operator of the Web page server 204, use a CAPTCHA to verify that the requester is a human and not an automaton before authorizing the call and issuing a token and/or take some other action such as asking the user for login/credentials to make sure that the user seeking to make a call is a registered user. If the user is not a registered user or the CAPTCHA fails the Web server may, and in some embodiments does, decide not to issue an authorization token.

In this example, consider that the web page server 204 has decided to issue an authorization token to client device 202. Web page server 204 generates and sends an authorization token 260 to client device 202. In various embodiments, the authorization token 260 includes an encrypted portion which is generated based on a random number, e.g., the random number received in the request for authorization token signal. In some embodiments the authorization token 260 is a signed authorization token with a time dependent encrypted portion and an unencrypted portion. In other embodiments, the authorization token may or may not be signed and includes the encrypted portion with the Java script running on the Web browser being responsible for communicating the unencrypted portion to the session border controller for use with the authorization token when determining whether or not to allow a call to proceed. In one particular embodiment the JavaScript running on the Web browser provides a random number to WebServer. The Web server uses this random number and other information elements to generate an encrypted token which the Web server then returns to the Web browser for use by the JavaScript running on the Web browser. The JavaScript running on the Web browser then puts the encrypted token and the random number, e.g., in unencrypted form, that was sent to the WebServer in a signal, e.g., a session initiation signal, which is sent to the SBC. The SBC then decrypts the token and checks whether the random number component there matches the random number sent unencrypted in the signal from the Web browser that was sent to the SBC to initiate the call.

In various embodiments, JavaScript call initiate module 216 performs one or more of all of: detecting user input selecting a call button, generating a request authorization token, sending request for authorization token 254, receiving request for input captcha, prompting the user for input captcha, receiving user input captcha, transmitting the user input captcha response, and receiving an authorization token. Call authorization routine 228 decides whether or not a call should be authorized in response to the request for a token from the client device 202. As part of call authorization, the web page server 204 decides whether or not a token should be issued in response to request 254. Token authorization routine 230 decides whether or not a token should be granted in response to the request, e.g., depending upon the response 258 corresponding to the request for user input captcha. If the token authorization routine decides to issue a token, encryption/token generation module 232 generates the authorization token. In some embodiments, the client device sends a random number to the web page server which is used, along with the shared secret 226 to generate an encrypted portion of the token. In some embodiments, the token generated by module 232 includes time information based on information from clock module 224. In various embodiments, the token includes a signature generated by the web page server 204, which was authorized to issue the token, e.g., on behalf of the company corresponding to phone 212. In some embodiments, the token or a portion of the token encrypted by a shared secret (shared secret known by WebServer and SBC) before or after signature.

Client device 202 receives authorization token 260 and sends a call initiation signal 262, e.g., an INVITE such as a SIP INVITE with the received authorization token to SBC 208. In various embodiments, JavaScript call initiate module 216 generates and transmits signal 262. Call initiation signal 262 is part of bi-directional call control signaling, e.g., SIP and/or SDP (Session Description Protocol) signaling, between the client device 202 and SBC 208.

The SBC 208 receives the invite signal including the call authorization token, e.g., SIP INVITE signal including the call authorization token and SDP information, and processes the received information 264. The processing includes checking the signature included in the authorization token and decrypting the encrypted portion of the token. The processing further includes checking time information included in the token to verify that the token was valid from a time perspective at the time the token was received. The authorization token checking module 234 performs the various validity checks including a signature check, a time check based on time information included in the received token and received time info based on clock module 238 measurements, and a check of the decrypted data. Decryption module 236 decrypts the encrypted portion of the received data using shared secret 240 and compares the decrypted data to unencrypted data communicated in the token. In some embodiments, the unencrypted data included in the token is the random number communicated by the client device 202 to the web page server, which was previously used to generate the encrypted information.

In this example, consider that the SBC 208 has determined that the received authorization token is currently valid. SBC 208 generates and sends a call control signal or signals, e.g., a SIP and/or SDP signal(s), included as part of bi-directional call control signaling 266 to call server 210, which is coupled to phone 212. The call server 210 generates and sends a call control signal or signals, e.g., SIP and/or SDP signals, as part of call control signaling 268 to phone 212. SBC 208 establishes a Real-Time Protocol/User Datagram Protocol (RTP/UDP) voice/data path between client device 202 and SBC 208 over which RTP/UDP voice/data signals 270 are communicated corresponding to the established call. SBC 208 further establishes a RTP/UDP voice/data path between SBC 208 and phone 212 over which RTP/UDP voice/data signals 272 are communicated corresponding to the established call. Thus, a connection has been established between client device 202 and phone 212, e.g., a customer service representative phone, and voice/data signals are communicated between the client device 202 and the phone 212.

Figure 3:
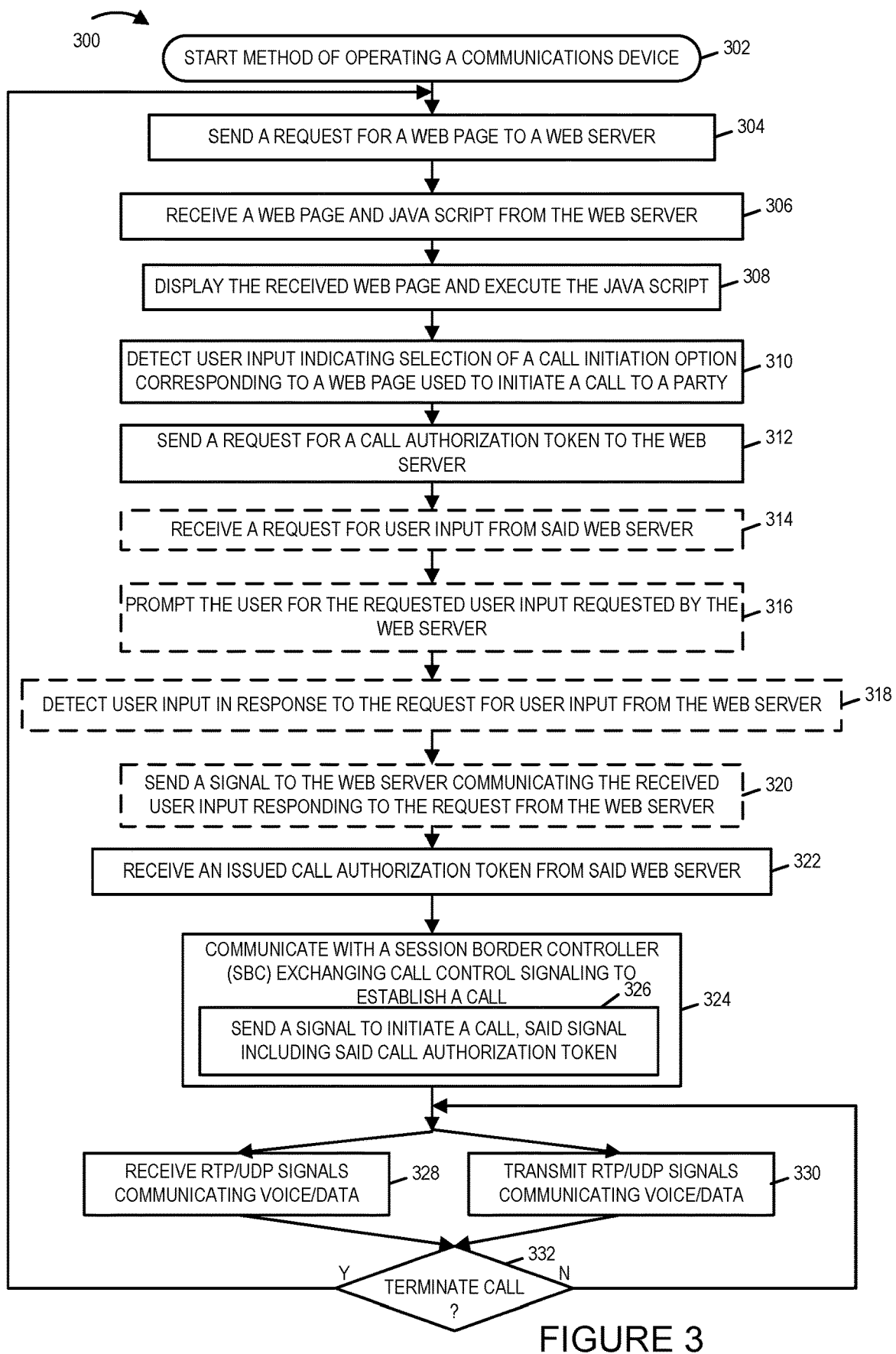
FIG. 3 is a flowchart illustrating a method of operating a communications device, e.g., a client device including a web browser, in accordance with various embodiments of the present invention.

FIG. 3 is a flowchart 300 of an exemplary method of operating a communications device, e.g., a client device including a web browser, in accordance with various exemplary embodiments. The communications device implementing the method of flowchart 300 is, e.g., client device 202 of system 200 of FIG. 2.

Operation of the exemplary method starts in step 302 in which the communications device is powered on and initialized. Operation proceeds from step 302 to step 304. In step 304 the communications device sends a request for a web page to a web server, e.g., a web page server. Operation proceeds from step 304 to step 306. In step 306 the communications device receives a web page and JavaScript from the web server. Operation proceeds from step 306 to step 308, in which the communications device displays the received web page and executes the JavaScript. Operation proceeds from step 308 to step 310.

In step 310 the communications device detects user input indicating selection of a call initiation option corresponding to a web page used to initiate a call to a party. Operation proceeds from step 310 to step 312. In step 312 the communications device sends a request for a call authorization token to the web server. In some embodiments, the request for a call authorization token includes a random number. In some embodiments, operation proceeds from step 312 to step 322. In some other embodiments, operation proceeds from step 312 to step 314.

In step 314 the communications device receives a request for user input from said web server, e.g., a request for user input captcha. In some embodiments, the request is a request that the user enter text corresponding to a phrase supplied by the web server. In some embodiments, the request is a request that the user enter text answering a question supplied by the web server. Operation proceeds from step 314 to step 316. In step 316 the communications device prompts the user for the requested user input that was requested by the web server. Operation proceeds from step 316 to step 318.

In step 318 the communications device detects user input in response to the request for user input from the web server. Operation proceeds from step 318 to step 320. In step 320 the communications device sends a signal to the web server communicating the received user input responding to the request from the web server. Operation proceeds from step 320 to step 322.

In step 322 the communications device receives an issued call authorization token from said web server. In some embodiments, the issued call authorization token includes at least some encrypted information and additional information. In some embodiments, said encrypted information is generated based on a signal from said communications device. In some embodiments, the signal from the communications device includes a random number used to generate the encrypted information. In some embodiments, the signal from the communications device including the random number is the token request signal sent in step 312. In some embodiments, the signal from the communications device includes a message providing information entered by a user of said communications device in response to a request for user input. In some embodiments, the signal from the communications device including the message was communicated in step 320. In some embodiments, the request for user input is a request that the user enter text corresponding to a phrase supplied by the web server. In some embodiments, the request for user input was received by the communications device in step 318. Operation proceeds from step 322 to step 324.

In step 324, the communications device communicates with a session border controller exchanging call control signaling to establish a call. Step 324 includes step 326 in which the communications device sends a signal, e.g., to the SBC, to initiate a call, said signal including said call authorization token. In some embodiments, the signal to initiate a call is an invite message, e.g., a SIP INVITE message, including information identifying the party to which the call is directed and the issued call authorization token.

Operation proceeds from step 324 to step 328 and 330. In step 328 the communications device receives RTP/UDP signals communications voice/data corresponding to the established call. In step 330 the communications device transmits RTP/UDP signal communicating voice/data corresponding to the established call. Operation proceeds from steps 328 and 330 to step 332.

In step 332 the communications device checks if the call is terminated. If it is determined that the call is terminated, then operation proceeds from step 332 to the input of step 304. However, if the call is not terminated, then operation proceeds from step 332 to the input of steps 328 and 330 to communicate additional RTP/UDP voice/data signals corresponding to the ongoing call.

In some embodiments, the communications device implementing the method of flowchart 300 is client device 202 of FIG. 2, the web server is web page server 204 of FIG. 2, and the session border controller (SBC) is session border controller (SBC) 208 of FIG. 2.

Figure 4:
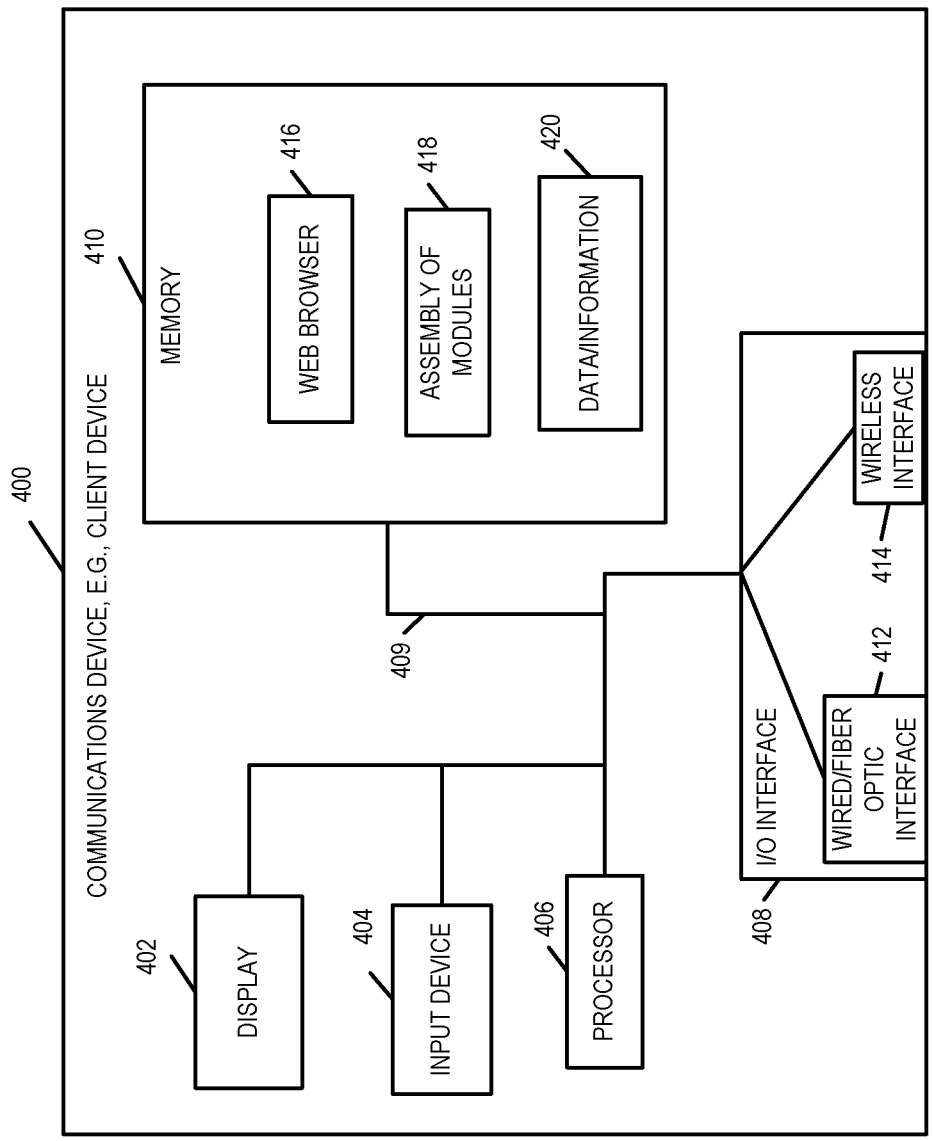
FIG. 4 illustrates an exemplary communications device, e.g., a client device including a web browser, which may implement the method of FIG. 3, in accordance with various embodiments.

FIG. 4 illustrates an exemplary communications device 400, e.g., a client device including a web browser, in accordance with various exemplary embodiments. Communications device 400 is, e.g., client device 202 of system 200 of FIG. 2. Communications device 400 includes a display 402, an input device 404, a processor 406, an I/O interface 408 and memory 410 coupled together via a bus 409 over which the various elements may exchange data and information. I/O interface 408 includes a wired/fiber optic interface 412 and a wireless interface 414. Memory 410 includes a web browser 416, an assembly of modules 418 and data/information 420.

Display 402 displays information to the user of communications device 400, e.g., a selected web page including a call button, a request for user input captcha, etc. Input device 404, e.g., touchscreen interface, keyboard, etc., receives user input, e.g., user input indicating selection of a call button, user input in response for a request for user input captcha, etc. Processor 402, e.g., a CPU, executes routines and uses data/information in memory 404 to controls operation of communications device 400 and implement the steps of a method, e.g., the method of flowchart 200 of FIG. 2. I/O interface 408 couples the communications device 200 to other devices and/or the Internet.

Figure 5:
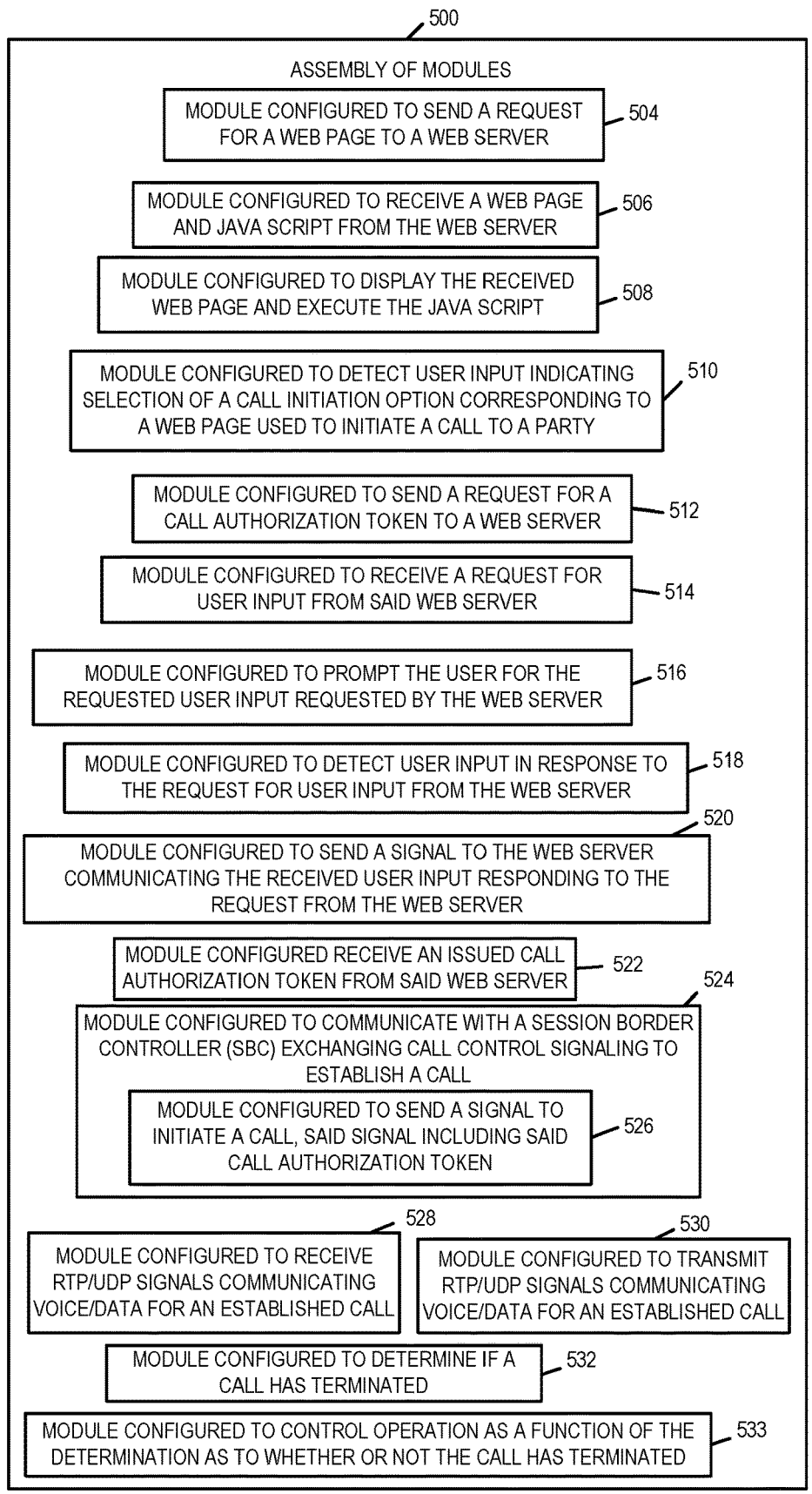
FIG. 5 illustrates an exemplary assembly of modules which can, and in some embodiments is, used in the exemplary communications device illustrated in FIG. 4.

FIG. 5 illustrates an assembly of modules 500 which can, and in some embodiments is, used in the communications device 400 illustrated in FIG. 4. In some embodiments the assembly of modules 500 can be implemented in hardware within the processor 406 of the client device 500, e.g., as individual circuits or other individual pieces of hardware. The modules in the assembly 500 can, and in some embodiments are, implemented fully in hardware within the processor 406, e.g., as individual circuits. In other embodiments some of the modules are implemented, e.g., as circuits, within the processor 406 with other modules being implemented, e.g., as circuits, external to and coupled to the processor. As should be appreciated the level of integration of modules on the processor and/or with some modules being external to the processor may be one of design choice.

Alternatively, rather than being implemented as circuits, all or some of the modules may be implemented in software and stored in the memory 410 of the communications device 400, with the modules controlling operation of communications device 400 to implement the functions corresponding to the modules when the modules are executed by a processor, e.g., processor 406. In some such embodiments, the assembly of modules 500 is included in the memory 410 as assembly of modules 418. In still other embodiments, various modules are implemented as a combination of hardware and software, e.g., with another circuit external to the processor providing input to the processor 806 which then under software control operates to perform a portion of a module's function. While shown in the FIG. 4 embodiment as a single processor, e.g., computer, it should be appreciated that the processor 406 may be implemented as one or more processors, e.g., computers.

When implemented in software the modules include code, which when executed by the processor 406, configure the processor 406 to implement the function corresponding to the module. In embodiments where the assembly of modules 500 is stored in the memory 410, the memory 410 is a computer program product comprising a computer readable medium comprising code, e.g., individual code for each module, for causing at least one computer, e.g., processor 406, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 5 control and/or configure the communications device 400 or elements therein such as the processor 406, to perform the functions of the corresponding steps illustrated in the method flowchart 300 of FIG. 3. Thus the assembly of modules 500 includes various modules that perform functions of the corresponding steps of the method shown in FIG. 3.

Assembly of modules 500 includes a module 504 configured to send a request for a web page to a web server, a module 506 configured to receive a web page and JavaScript from a web server, and a module 508 configured to display a received web page and execute received JavaScript. Assembly of modules 500 further includes a module 510 configured to detect user input indicating selection of a call initiation option corresponding to a web page used to initiate a call to a party, a module 512 configured to send a request for a call authorization token to a web server, a module 514 configured to receive a request for user input from a web server, a module 516 configured to prompt a user for requested input requested by a web server, and a module 518 configured to detect user input in response to a request for user input from a web server. In some embodiments, the request for user input is a request that the user enter text corresponding to a phrase supplied by the web server. In some embodiments, the request for user input is a request that the user enter text to answer a question supplied by the web server. In some embodiments, the request for a call authorization token includes a random number.

Assembly of modules 500 further includes a module 520 configured to send a signal to a web server communicating received user input responding to a request from the web server, a module 522 configured to receive an issued call authorization token from a web server, and a module 524 configured to communicate with a session border controller (SBC) exchanging call control signaling to establish a call. Module 524 further includes a module 526 configured to send a signal, e.g., to a SBC, to initiate a call, said signal including a call authorization token. In some embodiments, the signal to initiate a call is an invite message, e.g., a SIP INVITE message, including information identifying the party to which the call is directed and the issued call authorization token.

In some embodiments, the issued call authorization token includes at least some encrypted information and additional information. In some such embodiments, said encrypted information is generated based on a signal from the communications device, e.g., a signal sent by module 520. In some embodiments, the signal from the communications device includes a message providing information entered by a user of said communications device in response to a request for user input, e.g., the request received by module 516.

Assembly of module 500 further includes a module 528 configured to receive RTP/UDP signals communicating voice/data for an established call, a module 530 configured to transmit RTP/UDP signals communicating voice/data for an established call, a module 532 configured to determine if a call has been terminated, and a module 533 configured to control operation as a function of a determination as to whether or not a call has been terminated.

Figure 6:
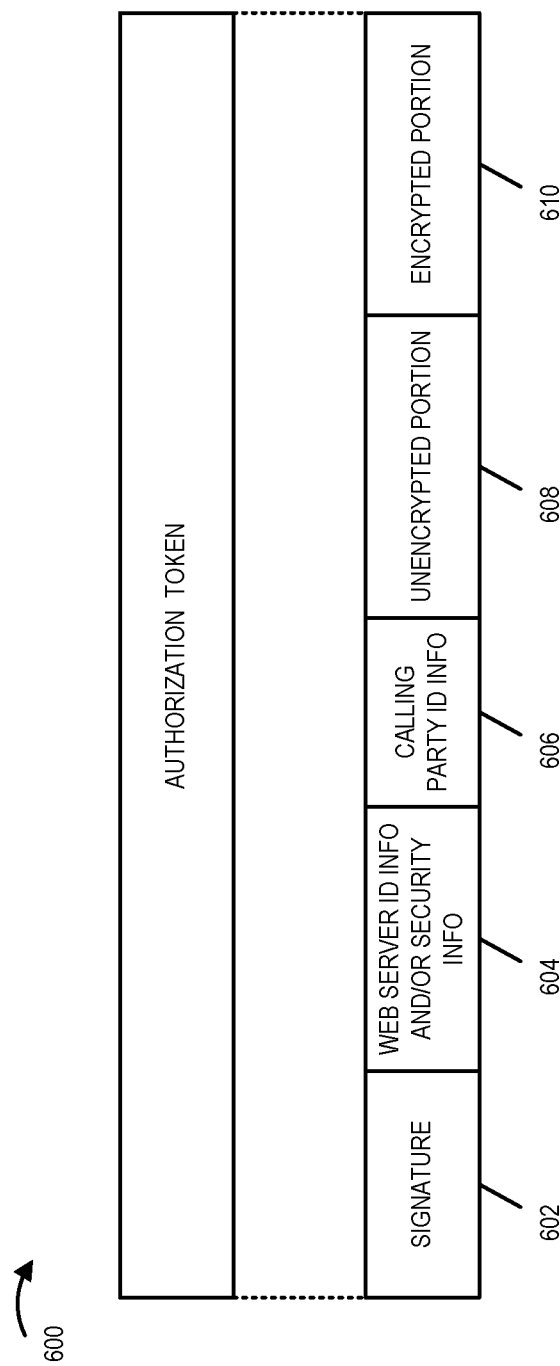
FIG. 6 is a drawing of an exemplary authorization token in accordance with various exemplary embodiments.

FIG. 6 is a drawing of an exemplary authorization token in accordance with various exemplary embodiments. Exemplary authorization token 600 includes a signature 602, web server ID information and/or security information 604, a calling party ID information 606, an unencrypted portion 608, and an encrypted portion 610. The signature is, e.g., the signature of the web server, e.g., web page server, which generated the token and which was authorized to generate the token on behalf of the company to whose phone is the called party phone. In some embodiments, the unencrypted portion 608 includes time information pertaining to the time the token was generated and/or time validity information corresponding to the token. In some embodiments, the unencrypted portion includes a random number sent by the communications device, e.g., client device including a web browser, which requested the token. Web server ID information includes, e.g., an ID corresponding to the particular web server, e.g. web page server, which generated the token.

Figure 7A:
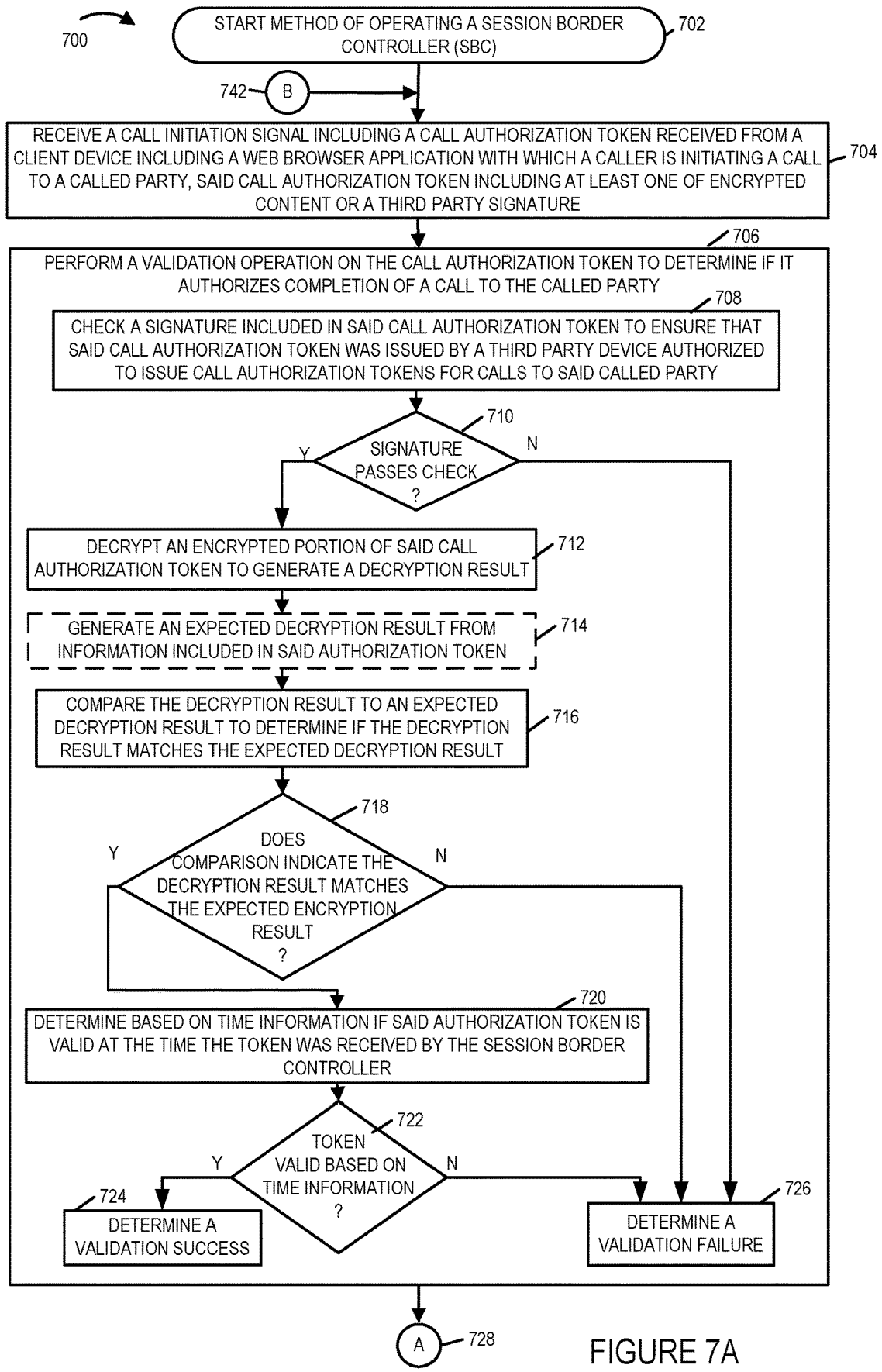
FIG. 7 shows the combination of FIGS. 7A and 7B.
FIG. 7B is a second part of a flowchart illustrating a method of operating a session border controller in accordance with various embodiments of the present invention.

FIG. 7, comprising the combination of FIG. 7A and FIG. 7B, is a flowchart 700 of an exemplary method of operating a session border controller (SBC) in accordance with various exemplary embodiments. In some embodiments, the session border controller is a session border controller including a media proxy. In some embodiments, the SBC implementing the method of flowchart 700 is SBC 208 of system of FIG. 2. Operation of the exemplary method starts in step 702, in which the SBC is powered on and initialized. Operation proceeds from step 702 to step 704.

In step 704 the SBC receives a call initiation signal including a call authorization token received from a client device including a web browser application with which a caller is initiating a call to a called party, said call authorization token including at least one of encrypted content or a third party signature. In some embodiments, the called party is a customer service representative corresponding to a company having a web page including a Web RTC based call option, and the call authorization token is issued by a web server corresponding to said company in response to a signal from the client device. In various embodiments, the called party is a customer representative of a company corresponding to a web page including at least some advertisements for company products or services and a Web RTC call initiation option which can be selected via a web browser on the client device to initiate a call to the called party. Operation proceeds from step 704 to step 706.

In step 706 the SBC performs a validation operation on the call authorization token to determine if it authorizes completion of a call to a called party. Step 706 includes steps 708, 710, 712, 716, 718, 720, 722, 724, and 726. In some embodiments step 706 further includes step 714.

In step 708 the SBC checks a signature included in said call authorization token to ensure that said call authorization token was issued by a third party device authorized to issue call authorization token for calls to said called party. Operation proceeds from step 708 to step 710, If the signature passes the check of step 708, then operation proceeds from step 710 to step 712. However, if the signature check of step 708 is a failure, then operation proceeds to step 726, in which the SBC determines that the validation was a failure.

Returning to step 712, in step 712 the SBC decrypts an encrypted portion of said call authorization token to generate a decryption result. In some embodiments, operation proceeds from step 712 to step 716. In other embodiments, operation proceeds from step 712 to step 714, in which the SBC generates an expected decryption result from information included in said authorization token. In some embodiments, the information included in said authorization token used to generate said expected decryption result is an input to a random number generator. Operation proceeds from step 714 to step 716. In step 716 the SBC compares the decryption result to an expected encryption result to determine if the decryption result matches the expected decryption result. In some embodiments, the expected decryption result is included in an unencrypted form in said authorization token. Operation proceeds from step 716 to step 718.

In step 718 the SBC determines if the comparison of step 716 indicates that the decryption result matches the expected encryption result and controls operation as a function of the determination. If the comparison does not indicate that the decryption result matches the expected decryption result, then operation proceeds from step 718 to step 726, in which the SBC determines that a validation failure has occurred. However, if the comparison indicates that the decryption result matches the expected decryption result, then operation proceeds from step 718 to step 720. In various embodiments, the authorization token includes time information. In step 720 the SBC determines, based on said time information, if said authorization token is valid at the time the token was received by the SBC. Operation proceeds from step 720 to step 722. If the determination of step 720 is that the authorization token was not valid, based on time information, at the time the token was received by the SBC, then operation proceeds from step 722 to step 726, in which the SBC determines that a validation failure has occurred. However, if the determination of step 720 is that the authorization token was valid, based on time information, at the time the token was received by the SBC, then operation proceeds from step 722 to step 724, in which the SBC determines that a validation success has occurred.

Operation proceeds from step 706 via connecting node A 728 to step 730. In step 730 the SBC determine whether or not the validation operation of step 706 determined that the call authorization token authorizes completion of a call to the called party and controls operation as a function of the determination. If the validation operation of step 706 resulted in a validation success, then operation proceeds from step 730 to step 732. If the validation operation of step 706 resulted in a validation failure then, operation proceeds from step 730 to step 734, in which the SBC sends a signal, rejecting establishment of a call to the called party, to said client device.

Returning to step 732, in step 732 the SBC establishes a call between the calling party and the called party. Step 732 includes step 736 in which the SBC establishes a voice data path between the client device and a phone device corresponding to said called party via said SBC.

Operation proceeds from step 732 to step 738 in which the SBC generates a call record including call information, e.g., call duration, information identifying the calling party, and information identifying the called party. Operation proceeds from step 738 to step 740 in which the SBC communicates the call record information to at least one of a web server, e.g., a web page server, or a web RTC server corresponding to said called part. Operation proceeds from step 740 or step 734, via connecting node B 742 to step 704.

Figure 8:
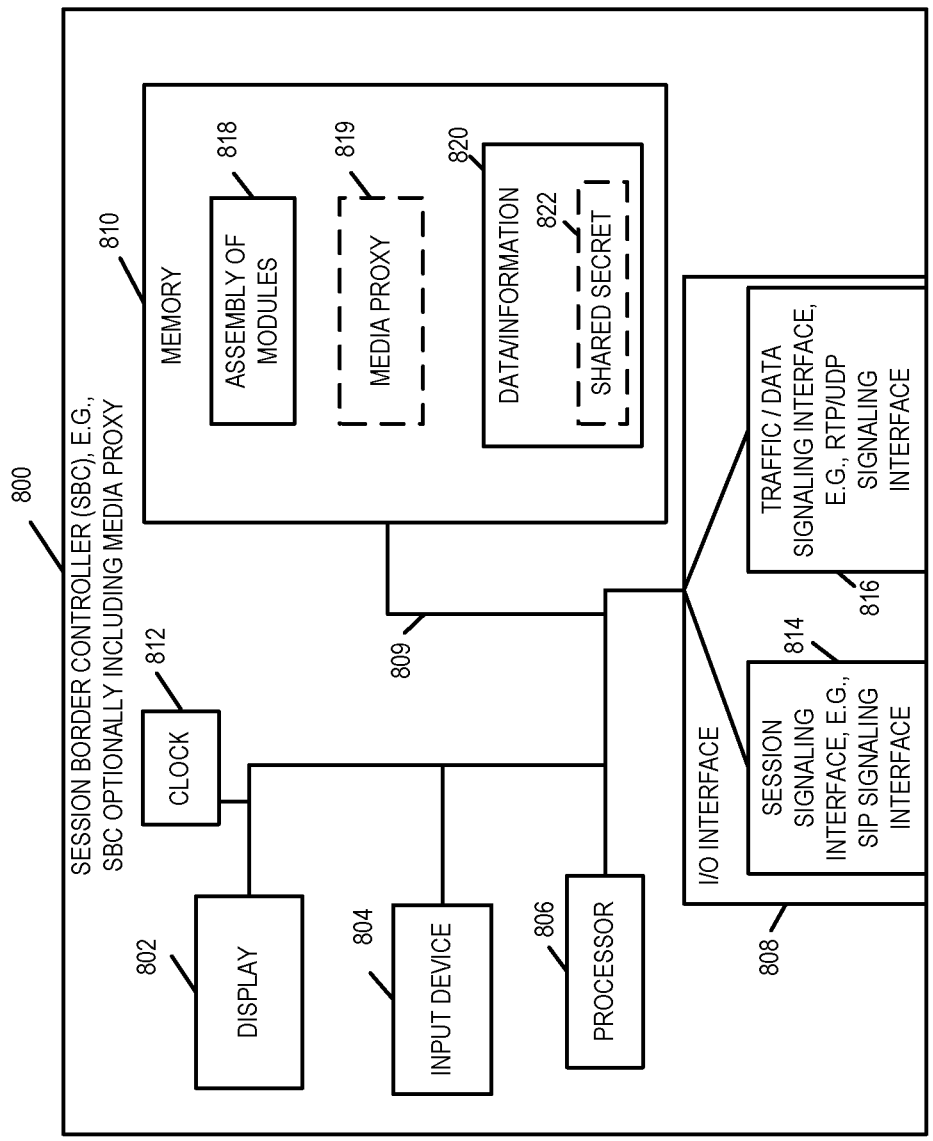
FIG. 8 illustrates an exemplary session border controller (SBC), which may implement the method of the flowchart of FIG. 7A and FIG. 7B, in accordance with various embodiments.

FIG. 8 illustrates an exemplary session border controller (SBC) 800, e.g., a SBC optionally including a media proxy, in accordance with various exemplary embodiments. SBC 800 is, e.g., SBC 208 of system 200 of FIG. 2. SBC 800 includes a display 802, an input device 804, a processor 806, an I/O interface 808, memory 810, and a clock 812 coupled together via a bus 809 over which the various elements may exchange data and information. I/O interface 808 includes session signaling interface 814, e.g., a SIP signaling interface, and a traffic/data signaling interface 816, e.g., a RTP/UDP signaling interface. Memory 810 includes an assembly of modules 818 and data/information 820. In some embodiments, memory 810 includes a media proxy 819. The media proxy 819, when included, supports protocol and/or media format conversions and interoperability. In some embodiments, data/information 820 includes a shared secret 822. The various embodiments the shared secret 822 is known to SBC 800 and a device which generates a call authorization token which is to be validated by SBC 800, e.g., a web server such as web page server 204 of system 200 of FIG. 2.

Figure 9A:
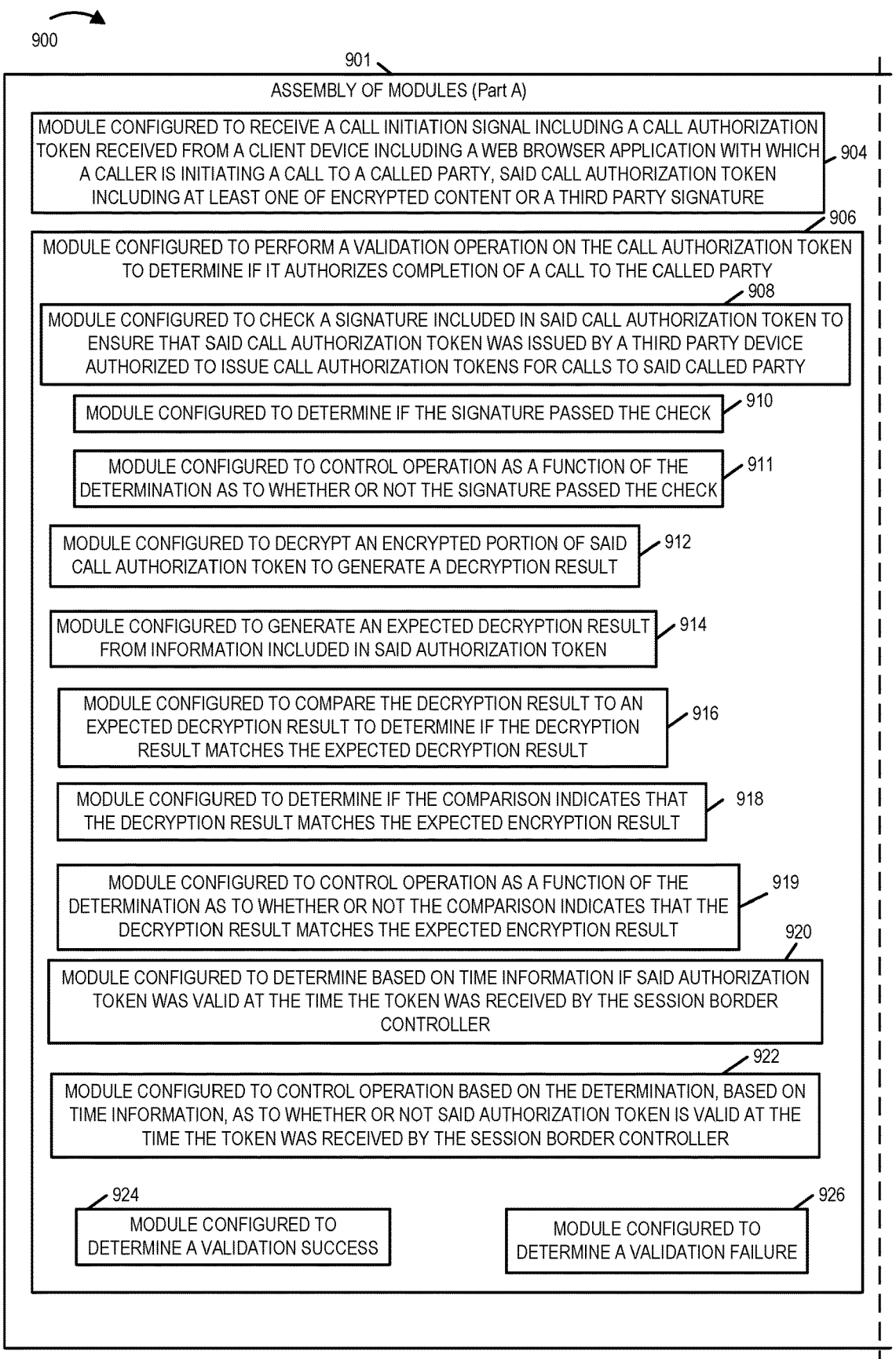
FIG. 9A illustrates a first portion of an exemplary assembly of modules which can, and in some embodiments is, used in the exemplary session border controller illustrated in FIG. 8.
Figures 9, 9B:
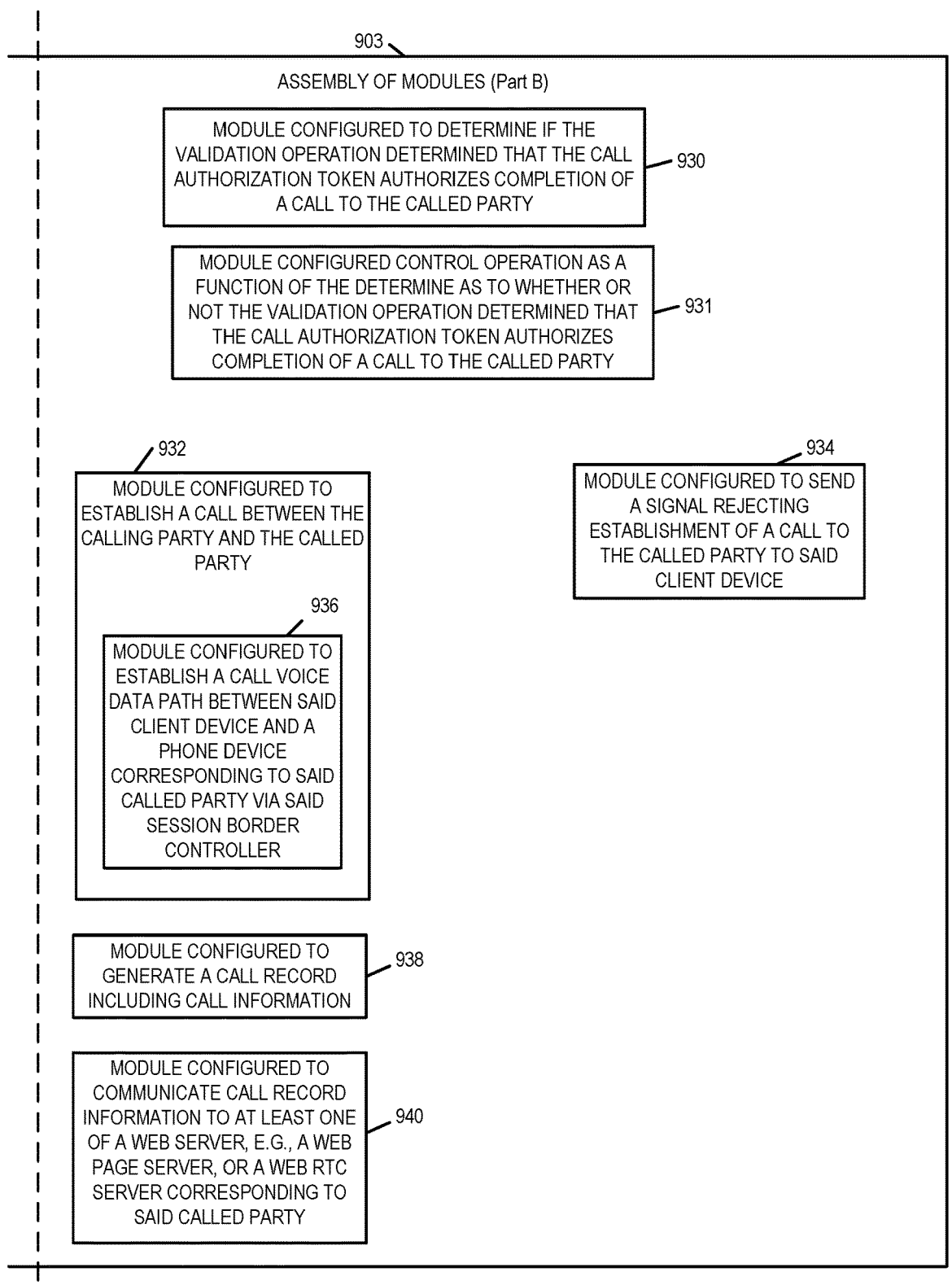
FIG. 9 illustrates the combination of FIGS. 9A and 9B.
FIG. 9B illustrates a second portion of an exemplary assembly of modules which can, and in some embodiments is, used in the exemplary SBC illustrated in FIG. 8.

FIG. 9 illustrates an assembly of modules 900 which can, and in some embodiments is, used in the session border controller (SBC) 800 illustrated in FIG. 8. In some embodiments the assembly of modules 900 can be implemented in hardware within the processor 806 of the SBC 800, e.g., as individual circuits. The modules in the assembly 900 can, and in some embodiments are, implemented fully in hardware within the processor 806, e.g., as individual circuits. In other embodiments some of the modules are implemented, e.g., as circuits, within the processor 806 with other modules being implemented, e.g., as circuits, external to and coupled to the processor. As should be appreciated the level of integration of modules on the processor and/or with some modules being external to the processor may be one of design choice.

Alternatively, rather than being implemented as circuits, all or some of the modules may be implemented in software and stored in the memory 810 of the SBC 800, with the modules controlling operation of SBC 800 to implement the functions corresponding to the modules when the modules are executed by a processor, e.g., processor 806. In some such embodiments, the assembly of modules 900 is included in the memory 810 as assembly of modules 818. In still other embodiments, various modules are implemented as a combination of hardware and software, e.g., with another circuit external to the processor providing input to the processor 806 which then under software control operates to perform a portion of a module's function. While shown in the FIG. 8 embodiment as a single processor, e.g., computer, it should be appreciated that the processor 806 may be implemented as one or more processors, e.g., computers.

When implemented in software the modules include code, which when executed by the processor 806, configure the processor 806 to implement the function corresponding to the module. In embodiments where the assembly of modules 900 is stored in the memory 810, the memory 810 is a computer program product comprising a computer readable medium comprising code, e.g., individual code for each module, for causing at least one computer, e.g., processor 806, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 9 control and/or configure the SBC 800 or elements therein such as the processor 806, to perform the functions of the corresponding steps illustrated in the method flowchart 700 of FIG. 7. Thus the assembly of modules 900 includes various modules that perform functions of the corresponding steps of the method shown in FIG. 7.

FIG. 9, comprising the combination of FIG. 9A and FIG. 9B, is a drawing of an assembly of modules 900 including Part A 901 and Part B 903, in accordance with various exemplary embodiments. Assembly of modules 900 includes a module 904 configured to receive a call initiation signal including a call authorization token, received from a client device including a web browser application with which a caller is initiating a call to a called party, said call authorization token including at least one of encrypted content or a third party signature, and a module 906 configured to perform a validation operation on the call authorization token to determine if it authorizes completion of a call to the called party.

In some embodiments, the called party is a customer service representative corresponding to a company having a web page including a Web RTC based call option, and the call authorization token is issued by a web server corresponding to the company in response to a signal from the client device. In various embodiments, the called party is a customer representative of a company corresponding to a web page including at least some advertisements for company products or services and a Web RTC call initiation option which can be selected via a web browser on the client device to initiate a call to the called party. In some embodiments, the SBC including assembly of modules 900 is a SBC including a media proxy.

Module 906 includes a module 908 configured to check a signature included in said call authorization token to ensure that said call authorization token was issued by a third party device authorized to issue call authorization tokens for calls to said called party, a module 910 configured to determine if the signature passed the check, and a module 911 configured to control operation as a function of the determination as to whether or not the signature passed the check. Module 906 further includes a module 912 configured to decrypt an encrypted portion of said call authorization token to generate a decryption result, a nodule 914 configured to generate an expected decryption result from information included in said authorization token, a module 916 configured to compare the decryption result to an expected decryption result to determine if the decryption result matches the expected decryption result, a module 918 configured to determine if the comparison indicates that the decryption result matches the expected decryption result, and a module 919 configured to control operation as a function of the determination as to whether or not the comparison indicates that the decryption result matches the expected decryption result. In some embodiments, the information included in the authorization token from which the expected encryption result is generated by module 914 is an input to a random number generator, e.g., seed value. In some embodiments, the expected decryption result is included in an unencrypted form in the authorization token. In various embodiments, the authorization token includes time information.

Module 906 further includes a module 920 configured to determine, based on time information, if said authorization token was valid at the time the token was received by the session border controller (SBC) and a module configured to control operation based on the determination, based on time information, as to whether or not the authorization token was valid at the time the token was received by the SBC.

Module 906 further includes a module 924 configured to determine a validation success and a module 926 configured to determine a validation failure.

Assembly of modules 900 further includes a module 930 configured to determine if the validation operation determined that the call authorization token authorizes completion of a call to the called party, a module 931 configured to control operation as a function of the determination as to whether or not the validation operation determined that the call authorization token authorizes completion of a call to the called party, a module 932 configured to establish a call between the calling party and the called party if the validation operation determines that the call authorization token authorized completion of the call to the called party and a module 934 configured to send a signal rejecting establishment of a call, to the called party, to said client device when the validation operation determines that the call authorization token does not authorize completion of the call to the called party. Module 932 includes a module 936 configured to establish a call voice/data path between said client device and a phone device corresponding to said called party via said session border controller (SBC) when the validation operation indicates that the caller is authorized to call the called party.

Assembly of modules 900 further includes a module 938 configured to generate a call record including call information, e.g., call duration, calling party, called party, and a module 940 configured to communicate call record information to at least one of a web server, e.g., a web page server, or a web RTC server corresponding to said called party.

Figure 10:
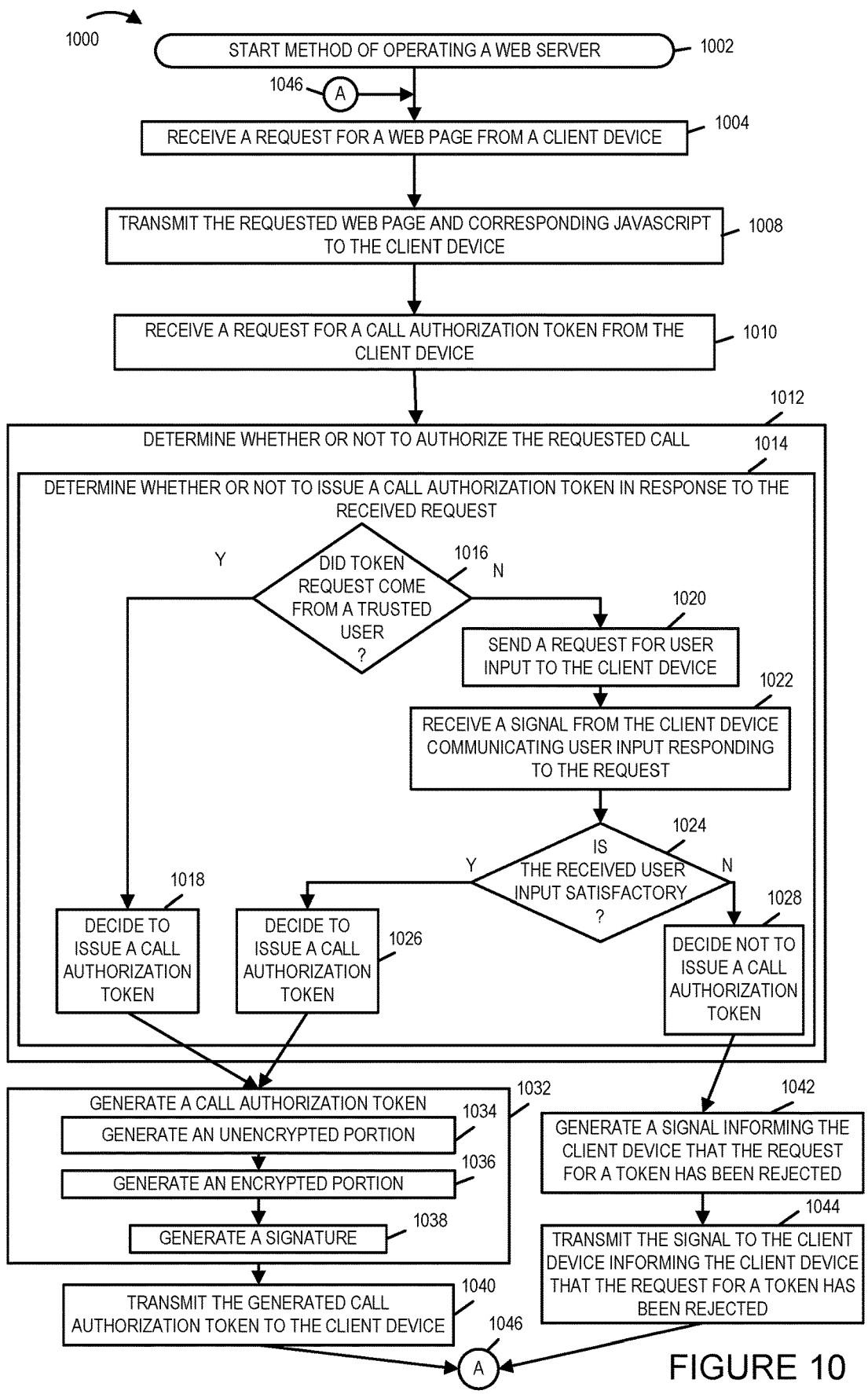
FIG. 10 is a flowchart illustrating a method of operating a web server, e.g., a web page server, in accordance with various embodiments of the present invention.

FIG. 10 is a flowchart 1000 of an exemplary method of operating a web server, e.g., a web page server, in accordance with various embodiments. Operation starts in step 1002 in which the web server is powered on and initialized. Operation proceeds from step 1002 to step 1004.

In step 1004 the web server receives a request for a web page from a client device. The web page server identifies the requested web page from among a plurality of web page pages in its web page library and identifies corresponding JavaScript to be communicated with the identified web page. Operation proceeds from step 1004 to step 1008, in which the web server transmits the request web page and corresponding JavaScript to the client device. Operation proceeds from step 1008 to step 1010.

In step 1010 the web server receives a request for a call authorization token from the client device. In some embodiments, the request message communicated in step 1010 includes a random number, e.g., a 128 bit random number. Operation proceeds from step 1010 to step 1012.

In step 1012 the web server determines whether or not to authorize the request call corresponding to the requested token. Step 1012 includes step 1014 in which the web server determines whether or not to issue a call authorization token in response to the received request. Step 1014 includes steps 1016, 1018, 1020, 1022, 1024, 1026 and 1028. In step 1016 the web server determines if the token request came from a trusted user, e.g., a user on a list of user to which call authorization tokens are to be granted when identified. In some embodiments, the trusted user is a user with a valid account for a service corresponding to the call authorization request.

If it is determined that the token request came from a trusted user, then operation proceeds from step 1016 to step 1018 in which the web server decides to issue a call authorization token. If it is determined that the token request did not come from a trusted user, then operation proceeds from step 1016 to step 1020, in which the web server sends a request for user input to the client device. Operation proceeds from step 1020 to step 1022, in which the web server receives a signal from the client device communicating user input corresponding to the request. Operation proceeds from step 1022 to step 1024.

In step 1024 the web server determines whether or not the received input is satisfactory. For example, it is determined if the requested input matches a particular string of characters which were presented to the user. Or it is determined if the user input is the correct answer to a question posed to the user. If in step 1024, it is determined that the received user input is satisfactory, then operation proceeds from step 1024 to step 1026 in which the web server decides to issue a call authorization token to the client device. If in step 1024, it is determined that the received user input is not satisfactory, then operation proceeds from step 1024 to step 1028 in which the web server decides not to issue a call authorization token.

Operation proceeds from step 1018 or step 1026 to step 1032 in which the web server generates a call authorization token. Step 1032 includes steps 1034, 1036 and 1038. In step 1034 the web server generates an unencrypted portion of the token. In step 1036 the web server generates an encrypted portion using a random number and a shared secret. In step 1038 the web server generates a signature. Operation proceeds from step 1032 to step 1040 in which the web server generates the transmitted call authorization token to the client device.

Returning to step 1028, operation proceeds from step 1028 to step 1042 in which the web server generates a signal informing the client device that the request for a token has been rejected. Operation proceeds from step 1042 to step 1044 in which the web server transmits the signal to client device informing the client device that the request for a call authorization token has been rejected.

Operation proceeds from step 1040 or step 1044, via connecting node A 1046 to step 1004.

In this exemplary embodiment, a call authorization token can be granted if either the request was identified as coming from a trusted user or the user answers the request for user input satisfactory. In some embodiments, the determination as to whether or not a token is granted is based on identifying whether or not the request came from a trusted user, e.g., if the user making the request is identified as being on a list of authorized users to which tokens are to be granted the request is granted otherwise the request is denied. In some other embodiments, the determination as to whether or not a token is granted is based on a response to a request to user input e.g., if the answer to a request for user input is satisfactory the request for the token is granted and if the answer is unsatisfactory the request for the token is denied.

In some embodiments, the web server limits the number of the tokens that can be granted to the same client device or same user over a given time interval. In some embodiments, the web server limits the number of the tokens that can be granted to the same client device or same user over a given time interval.

Figure 11:
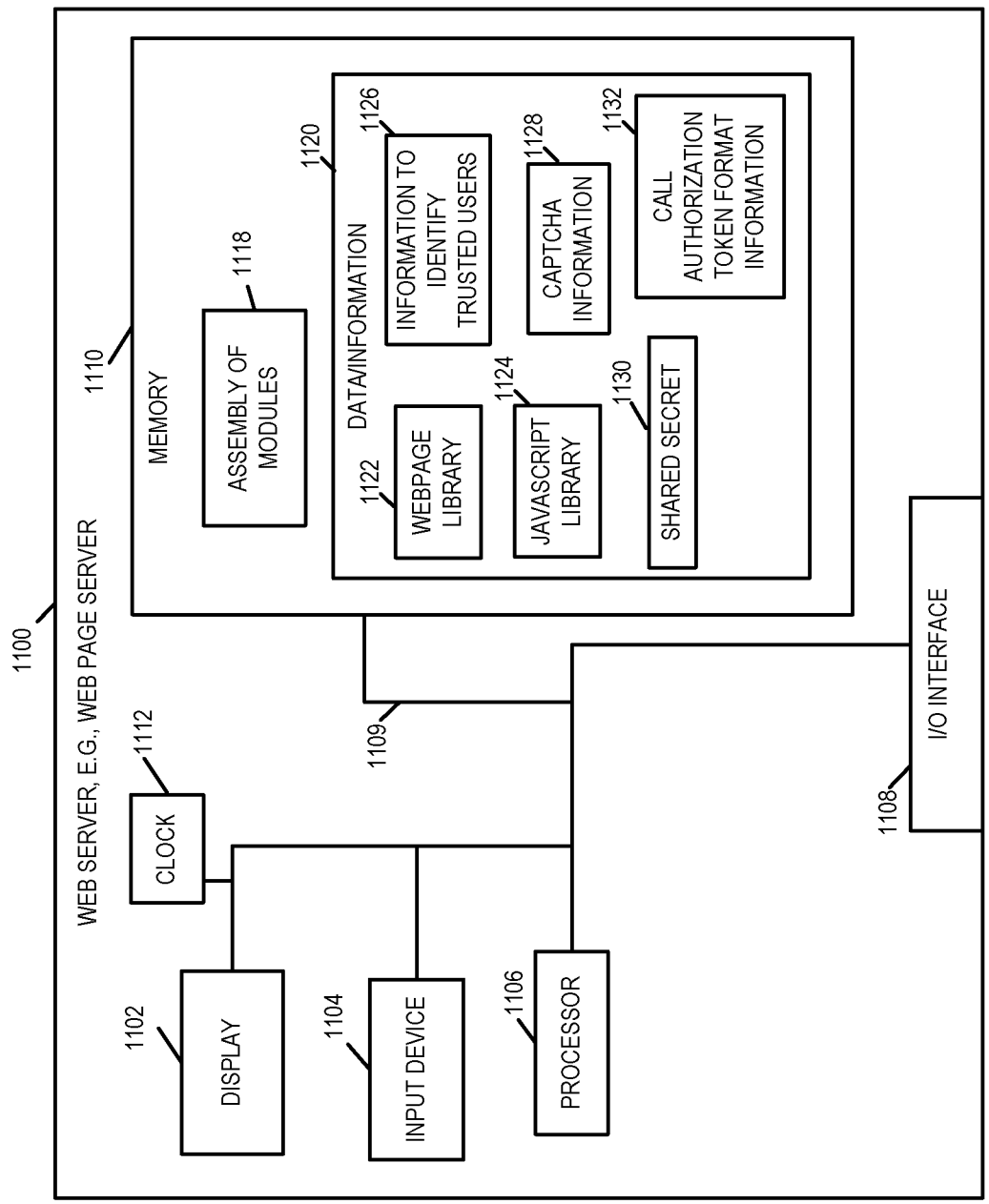
FIG. 11 illustrates an exemplary web server, e.g., a web page server, which may implement the method of FIG. 10, in accordance with various embodiments.

FIG. 11 illustrates an exemplary web server 1100, e.g., a web page server, in accordance with various embodiments. Web server 1100 is, e.g., web page server 204 of system 200 of FIG. 2. Web server 1100 includes a display 1102, an input device 1104, e.g., a keyboard or keypad, a processor 1106, e.g., a CPU, an I/O interface 1108, e.g., a wired, fiber optic, and/or wireless interface for sending and receiving signals, memory 1110, and a clock 1112 coupled together via a bus 1109 over which the various elements may exchange data and information. I/O interface 1108 couples the device 1100 to other nodes and/or the Internet. Memory 1110 includes an assembly of modules 1118 and data/information 1120. Data/information 1120 includes a web page library 1122 including a plurality of different web pages, a JavaScript library 1124 including a plurality of different JavaScript modules corresponding to different web pages, information used to identify trusted users 1126, e.g., information corresponding to a list of devices or users to which tokens are to be issued corresponding to a particular called party, captcha information 1128, a shared secret 1130, and call authorization token format information 1132. The various embodiments shared secret 1130 is known to web server 1100 and a session border controller (SBC) which is to be validate the token generated by the web server 1100.

Figure 12:
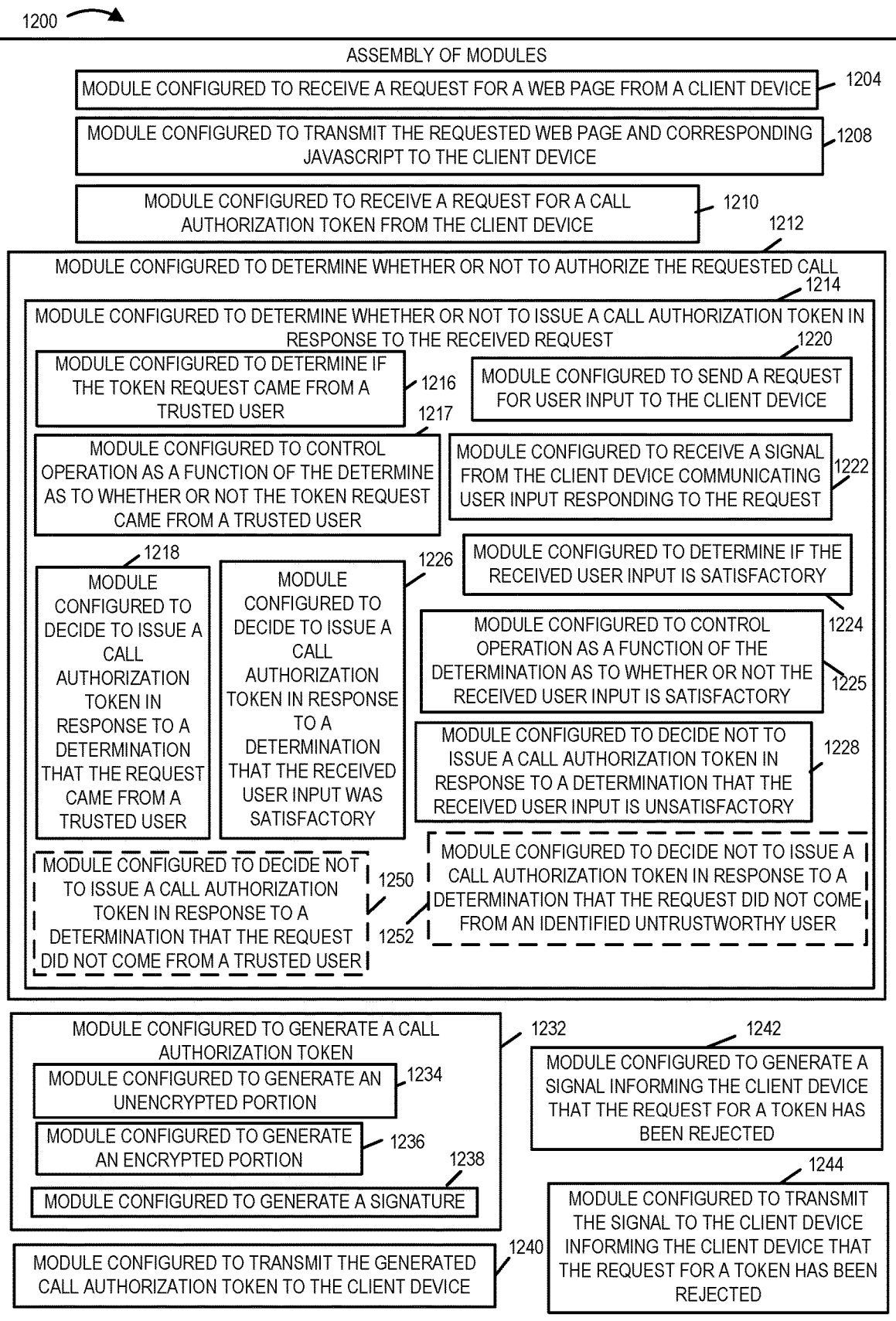
FIG. 12 illustrates an exemplary assembly of modules which can, and in some embodiments is, used in the exemplary web server illustrated in FIG. 11.

FIG. 12 illustrates an assembly of modules 1200 which can, and in some embodiments is, used in the web server 1100 illustrated in FIG. 11. In some embodiments the assembly of modules 1200 can be implemented in hardware within the processor 1106 of the web server 1100, e.g., as individual circuits. The modules in the assembly 1200 can, and in some embodiments are, implemented fully in hardware within the processor 1106, e.g., as individual circuits. In other embodiments some of the modules are implemented, e.g., as circuits, within the processor 1106 with other modules being implemented, e.g., as circuits, external to and coupled to the processor. As should be appreciated the level of integration of modules on the processor and/or with some modules being external to the processor may be one of design choice.

Alternatively, rather than being implemented as circuits, all or some of the modules may be implemented in software and stored in the memory 1110 of the web server 1100, with the modules controlling operation of web server 1100 to implement the functions corresponding to the modules when the modules are executed by a processor, e.g., processor 1106. In some such embodiments, the assembly of modules 1200 is included in the memory 1110 as assembly of modules 1118. In still other embodiments, various modules are implemented as a combination of hardware and software, e.g., with another circuit external to the processor providing input to the processor 1106 which then under software control operates to perform a portion of a module's function. While shown in the FIG. 11 embodiment as a single processor, e.g., computer, it should be appreciated that the processor 1106 may be implemented as one or more processors, e.g., computers.

When implemented in software the modules include code, which when executed by the processor 1106, configure the processor 1106 to implement the function corresponding to the module. In embodiments where the assembly of modules 1200 is stored in the memory 1110, the memory 1110 is a computer program product comprising a computer readable medium comprising code, e.g., individual code for each module, for causing at least one computer, e.g., processor 1106, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 12 control and/or configure the web server 1100 or elements therein such as the processor 1106, to perform the functions of the corresponding steps illustrated in the method flowchart 1000 of FIG. 10. Thus the assembly of modules 1200 includes various modules that perform functions of the corresponding steps of the method shown in FIG. 10.

FIG. 12 is a drawing of an assembly of modules 1200 in accordance with various exemplary embodiments. Assembly of modules 1200 includes a module 1204 configured to receive a request for a web page from a client device, a module 1208 configured to transmit the requested web page and corresponding JavaScript to the client device, a module 1210 configured to receive a request for a call authorization token from the client device, and a module 1212 configured to determine whether or not to authorize the request call. Module 1214 includes a module 1214 configure to determine whether or not to issue a call authorization token in response to the received request. Module 1214 includes a module 1216 configured to determine if the token request came from a trusted user, a module 1217 configured to control operation as a function of the determination as to whether or not the token request came from a trusted user, a module 1218 configured to decide to issue a call authorization token in response to a determination that the request came from a trusted user, a module 1220 configured to send a request for user input to the client device, a module 1222 configured to receive a signal from the client device communicating user input responding to the request for user input, a module 1224 configured to determine if the received user input is satisfactory, a module 1225 configured to control operation as a function of the determination as to whether or not the received user input is satisfactory, a module 1226 configured to decide to issue a call authorization token in response to a determination that the received user input was satisfactory, and a module 1228 configured to decide not to issue a call authorization token in response to a determination that receive user input in unsatisfactory. In some embodiments, module 1214 includes a module 1250 configured to decide not to issue a call authorization token in response to a determination that the token request did not come from a trusted user. In some embodiments, module 1214 includes a module 1252 configured to decide not to issue a call authorization token in response to a determination that the token request came from an identified untrustworthy user.

Assembly of modules 1200 further includes a module 1232 configured to generate a call authorization token, and a module 1240 configured to transmit the generated call authorization token to the client device. Module 1232 includes a module 1234 configured to generate an unencrypted portion, a module 1236 configured to generate an encrypted portion, and a module 1238 configured to generate a signature. Assembly of modules 1200 further includes a module 1242 configured to generate a signal informing the client device that the request for a token has been rejected, and a module 1244 configured to transmit the signal to the client device informing the client device that the request for a token has been rejected.

Figure 13:
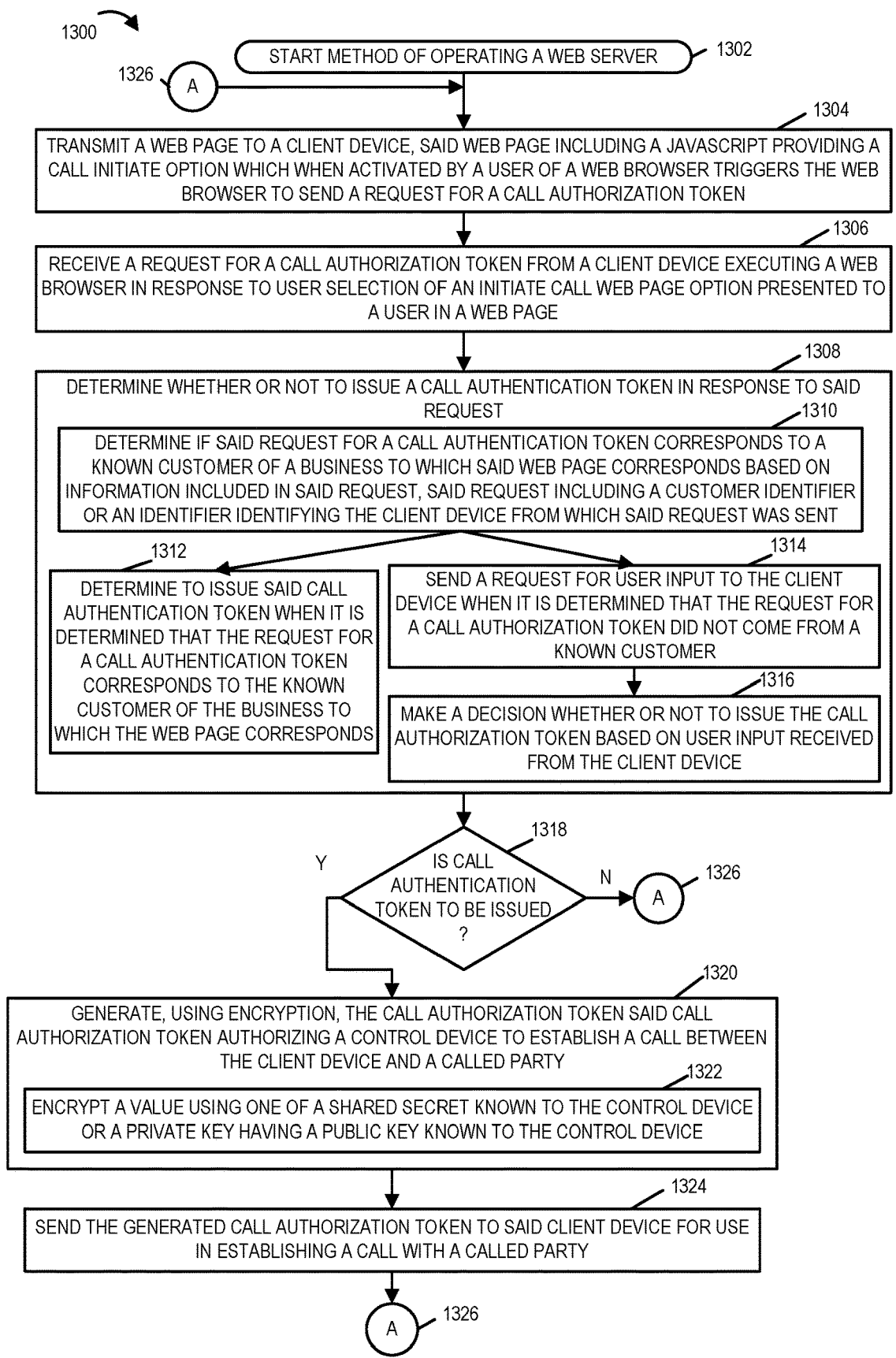
FIG. 13 is a flowchart illustrating a method of operating a web server, e.g., a web page server, in accordance with various embodiments of the present invention.

FIG. 13 is a flowchart 1300 of an exemplary method of operating a web server, e.g., a web page server, in accordance with an exemplary embodiment. Operation starts in step 1302, in which the web server is powered on and initialized. Operation proceeds from step 1302 to step 1304.

In step 1304 the web server transmits a web page to a client device, said webpage including a JavaScript providing a call initiate option which when activated by a user of a web browser triggers the web browser to send a request for a call authorization token. Operation proceeds from step 1304 to step 1306.

In step 1306 the web browser receives a request for a call authorization token from a client device executing a web browser in response to user selection of an initiate call web page option presented to a user in a web page. Operation proceeds from step 1306 to step 1308.

In step 1308 the web browser determines whether or not to issue a call authentication token in response to said request. Step 1308 includes steps 1310, 1312, 1314 and 1316. In step 1310 the web browser determines if said request for a call authentication token corresponds to a known customer of a business to which said web page corresponds based on information included in said request, said request including a customer identifier or an identifier identifying the client device from which said request was sent. Operation proceeds from step 1310 to step 1312 or step 1314 depending upon the determination of step 1310.

In step 1312 the web server determines to issue said call authentication token when it is determined that the request for a call authentication token corresponds to the known customer of the business to which the web page corresponds. In step 1314, the web server sends a request for user input to the client device when it is determined that the request for a call authorization token did not come from a known customer. Operation proceeds from step 1314 to step 1316 in which the web browser makes a decision whether or not to issue the call authorization token based on user input received from the client device.

Operation proceeds from step 1308 to step 1318. In step 1318 the web server controls operation as a function of the determination of step 1308. If it was determined that a call authentication token is to be issued, then operation proceeds from step 1318 to step 1320; otherwise operation proceeds from step 1318 via connecting node A 1326 to step 1304.

Returning to step 1320, in step 1320 the web server generates, using encryption, the call authorization token, said call authorization token authorizing a control device to establish a call between the client device and a called party. Step 1320 includes step 1322 in which the client device encrypts a value using one of shared secret known to the control device or a private key having a public key known to the control device. In some embodiments, the encryption operation is a signature operation which includes using said private key to generate a signature for said authorization token, said signature allowing a device receiving the generated authorization token to verify that the content of the authorization token was not altered and the authorization token was signed by said web server. In some embodiments, the encryption operation is used to encrypt a value using a shared secret known to said web server and to said control device but not to said client device. In some such embodiments, the call authorization token includes information restricting said control device to completing the request call to a party, e.g., a customer representative which may be identified by an IP address or telephone number, corresponding to a company to which the web page corresponds. In some embodiments, the authorization token includes lifetime information limiting the validity of the authorization token to a period of time specified by said web server.

Operation proceeds from step 1320 to step 1324. In step 1324 the web server sends the generated call authorization token to said client device for use in establishing a call with a called party. Operation proceeds from step 1324 via connecting node A 1326 to step 1304.

Figure 14:
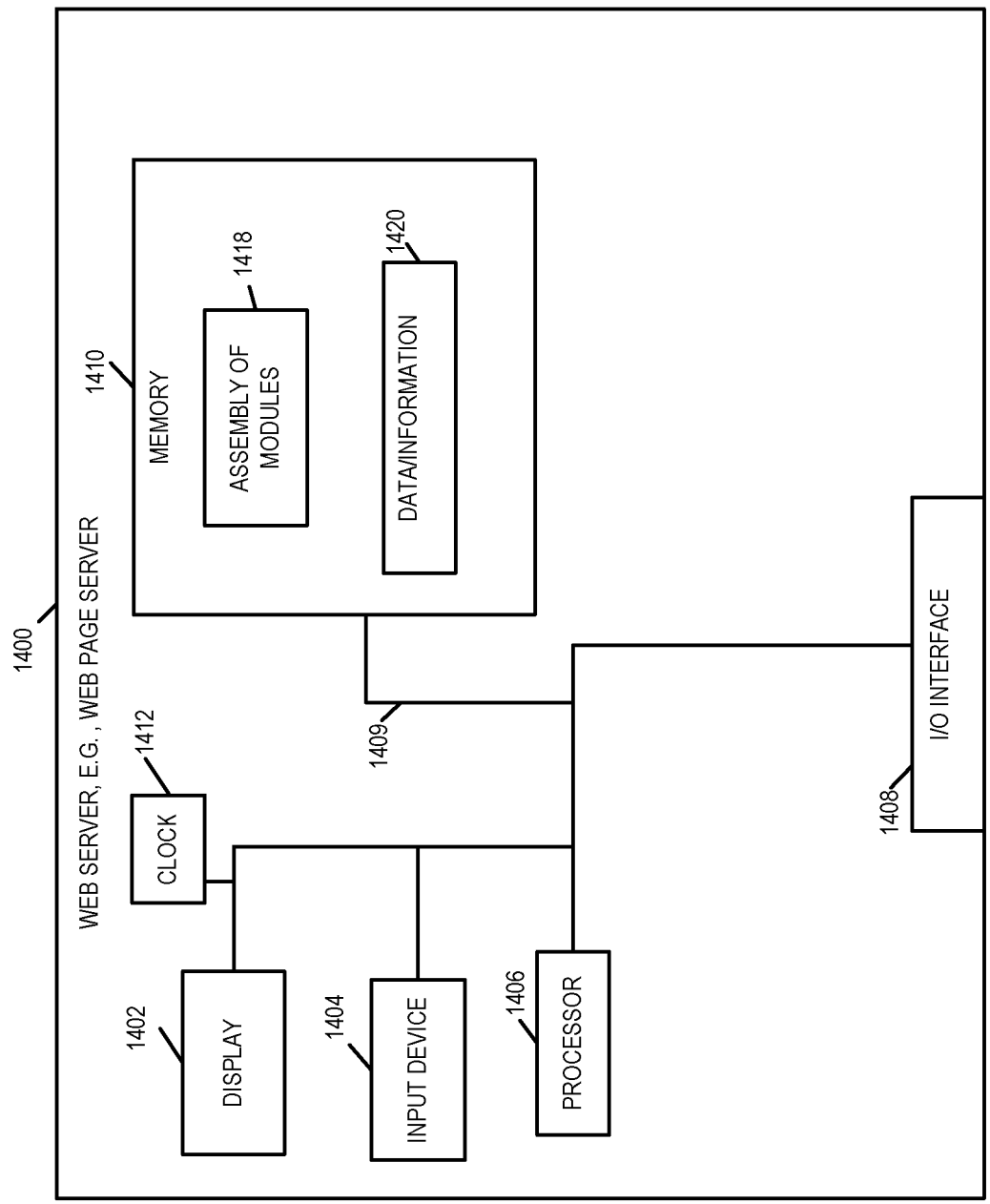
FIG. 14 illustrates an exemplary web server, e.g., a web page server, which may implement the method of FIG. 10, in accordance with various embodiments.

FIG. 14 illustrates an exemplary web server 1400, e.g., a web page server, in accordance with various embodiments. Web server 1400 is, e.g., web page server 204 of system 200 of FIG. 2. Web server 1400 includes a display 1402, an input device 1404, e.g., a keyboard or keypad, a processor 1406, e.g., a CPU, an I/O interface 1408, e.g., a wired, fiber optic, and/or wireless interface for sending and receiving signals, memory 1410, and a clock 1412 coupled together via a bus 1409 over which the various elements may exchange data and information. I/O interface 1408 couples the device 1400 to other nodes and/or the Internet. Memory 1410 includes an assembly of modules 1418 and data/information 1420.

Figure 15:
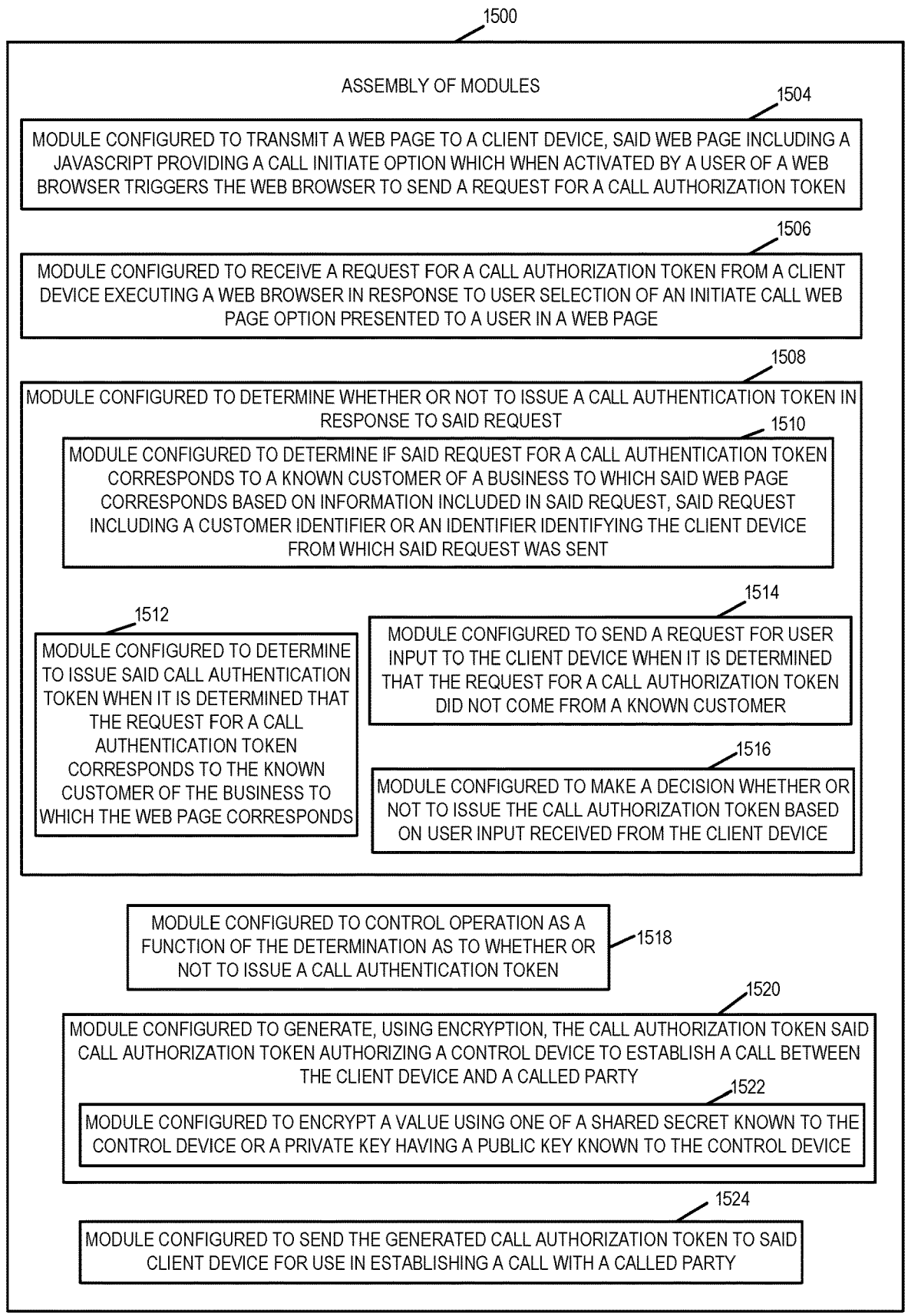
FIG. 15 illustrates an exemplary assembly of modules which can, and in some embodiments is, used in the exemplary web server illustrated in FIG. 14.

FIG. 15 illustrates an assembly of modules 1500 which can, and in some embodiments is, used in the web server 1400 illustrated in FIG. 14. In some embodiments the assembly of modules 1500 can be implemented in hardware within the processor 1406 of the web page server 1400, e.g., as individual circuits. The modules in the assembly 1500 can, and in some embodiments are, implemented fully in hardware within the processor 1406, e.g., as individual circuits. In other embodiments some of the modules are implemented, e.g., as circuits, within the processor 1406 with other modules being implemented, e.g., as circuits, external to and coupled to the processor. As should be appreciated the level of integration of modules on the processor and/or with some modules being external to the processor may be one of design choice.

Alternatively, rather than being implemented as circuits, all or some of the modules may be implemented in software and stored in the memory 1410 of the web server 1400, with the modules controlling operation of web server 1400 to implement the functions corresponding to the modules when the modules are executed by a processor, e.g., processor 1406. In some such embodiments, the assembly of modules 1500 is included in the memory 1410 as assembly of modules 1418. In still other embodiments, various modules are implemented as a combination of hardware and software, e.g., with another circuit external to the processor providing input to the processor 1406 which then under software control operates to perform a portion of a module's function. While shown in the FIG. 14 embodiment as a single processor, e.g., computer, it should be appreciated that the processor 1406 may be implemented as one or more processors, e.g., computers.

When implemented in software the modules include code, which when executed by the processor 1406, configure the processor 1406 to implement the function corresponding to the module. In embodiments where the assembly of modules 1500 is stored in the memory 1410, the memory 1410 is a computer program product comprising a computer readable medium comprising code, e.g., individual code for each module, for causing at least one computer, e.g., processor 1406, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 15 control and/or configure the web server 1400 or elements therein such as the processor 1406, to perform the functions of the corresponding steps illustrated in the method flowchart 1300 of FIG. 13. Thus the assembly of modules 1500 includes various modules that perform functions of the corresponding steps of the method shown in FIG. 13.

FIG. 15 is a drawing of an assembly of modules 1500 in accordance with various exemplary embodiments. Assembly of modules 1500 includes a module 1504 configured to transmit a web page to a client device, said web page including a JavaScript providing a call initiate option which when activated by a user of a web browser triggers the web browser to send a request for a call authorization token, a module 1506 configured to receive a request for a call authorization token from a client device executing a web browser in response to user selection of an initiate call web page option presented to a user in a web page, and a module 1508 configured to determine whether or not to issue a call authentication token in response to said request. Module 1508 includes a module 1510 configured to determine if said request for a call authorization token corresponds to a known customer of a business to which said web page corresponds based on information included in said request, said request including a customer identifier or an identifier identifying the client device to which said request was sent, a module 1512 configured to determined to issue said call authentication token when it is determined that the request for a call authentication token corresponds to the known customer of the business to which the web page corresponds, a module 1514 configured to send a request for user input to the client device when it is determined that the request for a call authentication token did not come from a known customer, and a module 1516 configured to make a decision whether or not to issue the call authentication token based on user input received from the client device.

Assembly of modules 1500 further includes a module 1518 configured to control operation as a function of the determination as to whether or not to issue a call authentication token, a module 1520 configured to generate, using encryption, the call authorization token, said call authentication token authorizing a control device to establish a call between the client device and a called party, and a module 1524 configured to send the generated call authentication token to said client device for use in establishing a call with a called party. Module 1520 includes a module 1522 configured to encrypt a value using one of a shared secret known to the control device or a private key having a public key known to the control device.

In some embodiments, the encryption operation is a signature operation which includes using said private key to generate a signature for said authorization token, said signature allowing a device receiving the generated authorization token to verify that the content of the authorization token was not altered and the authorization token was signed by said web server. In some embodiments, the encryption operation is used to encrypt a value using a shared secret known to said web server and to said control device but not to said client device. In some such embodiments, the call authorization token includes information restricting said control device to completing the request call to a party, e.g., a customer representative which may be identified by an IP address or telephone number, corresponding to a company to which the web page corresponds. In some embodiments, the authorization token includes lifetime information limiting the validity of the authorization token to a period of time specified by said web server.

Figure 16:
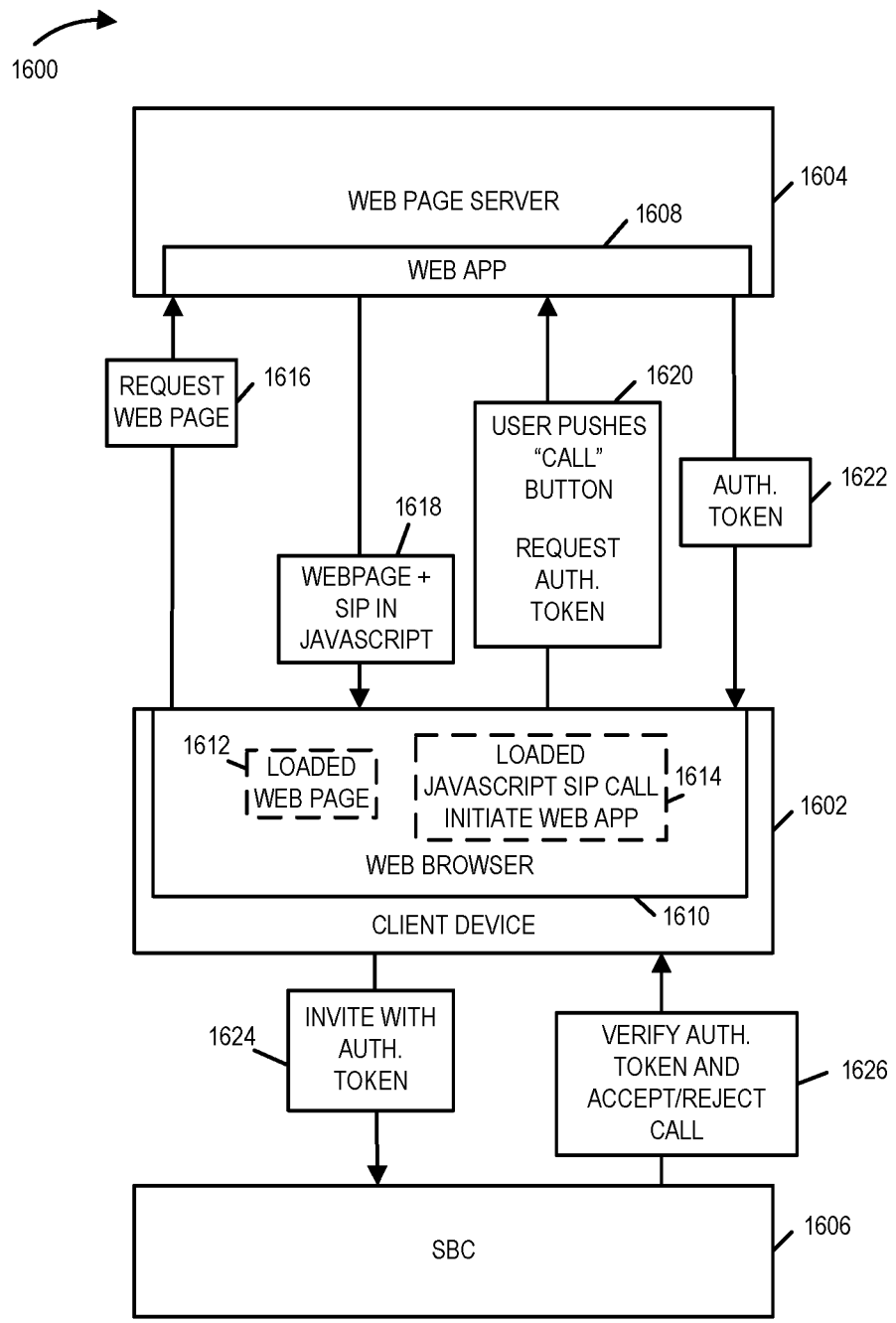
FIG. 16 is a drawing illustrating an example in which a call initiation option on a web page is selected by a client device, an authentication token is generated by a web page server and communicated to the client device; the authentication token is included in a SIP signal, e.g., a SIP invite signal, and the authentication token is validated by a SBC, prior to establishing the call.

Various aspects and/or features of some embodiments are further discussed below. For efficient call rate control, in various embodiments, the following definition is used for classifying a call to the call center as legitimate. A call which is allowed by Web Application corresponding to the Call Center to access the Call Center is legitimate. In various embodiments, the Web Application corresponding to the Call Center resides on, and is executed by a processor of, a Web page server. In various embodiments, the Web Application instead of the SBC determines whether the call should be allowed. This is advantageous because it is the Web Application which is performing a HTTP interaction with the browser from which a call is being initiated and has some level of understanding what the user is doing in terms of Web page activity and is maybe intending to do. Drawing 1600 of FIG. 16 illustrates an exemplary call rate control model.

Web browser 1610 of client device 1602 generates and sends a request for a web page to the web application 1608 located on, e.g., is executed by the processor of, web page server 1604, as indicated by box 1616. Web App 1608 responds by sending the requested webpage+SIP in JavaScript, to the client device 1602 including web browser 1610, as indicated by box 1618. Thus, the Web browser 1610 can execute the JavaScript and initiate a call using SIP signaling via the webpage. The web browser 1610 of the client device stores the received information as loaded web page 1612 and loaded JavaScript SIP call initiate web application 1614 which can be used to initiate a call using SIP signaling.

The communicated web page is displayed on the client device 1602. On the web page includes a user selectable a call button which can be selected to initiate a call. Consider that the user of the client device 1602 pushes the call button, and in response the JavaScript app 1614 generates and transmits a signal to web app 1608 of the web page server 1604 requesting an authorization token authorizing call setup and/or processing, e.g., by the SBC, as indicated by box 1620. The web app 1608 on the web page server 1604 decides whether or not to issue a call authorization token.

In this example, consider that the web app 1608 of the web page server 1604 decides to issue a call authorization token, and thus the web app 1608 generates the call authorization token and transmits the token to the JavaScript web app 1614 of the client device 1602.

The JavaScript web app 1614 of the client device 1602 generates and sends an INVITE with the received authorization token to the SBC 1606, as indicated by box 1624. The SBC 1606 verifies the received authorization token and sends an accept or reject call signal to the JavaScript web app 1614 of the client device 1602 in response to the result of the verification, as indicted by box 1626. Thus, the Web page server can authorize the SBC to proceed with a call via the authorization token communicated through client device 1602 without the need for the SBC to send signals to the Web page server to seek authorization for a call which might delay call set up. In this manner by the time a SIP related call signal reaches the SBC the call should already have been authorized by the Web server allowing the SBC to process the call signaling without have to contact the Web page server for authorization which could take time and introduce an additional signaling burden or requirement on the SBC which is avoided with the token based authorization approach described herein.

Various aspects of the invention relate to the generation and verification of the authentication token.

In some embodiments, whenever JavaScript web app 1614 on the client device 1602 requests a token from the web application 1608 of the web page server 1604, the JavaScript web app 1614 generates a random value, e.g., 128 bit random value, and sends it to Web App 1608 on the web page server 1604. Web App 1608 receives request and authorizes or rejects the request. In some embodiments, this is done by running a CAPTCHA or by enforcing presence of a valid account corresponding to the requesting customer or device on which the web browser is executing for the service. Once Web App 1608 successfully authorizes the request, the web app 1608 generates a value including the random value it received, date/time, e.g., in seconds granularity, and salt or random seed value used for encryption. The Web App 1608 encrypts the generated value with its secret key. The Web App 1608 returns this encrypted value to the web browser 1610 of the client device 1602 via, e.g., as part of, the authentication token.

In some embodiments, the browser 1610 uses an Authentication header, e.g., of a SIP INVITE message, to send the token to the SBC 1606. In some other embodiments, a different header is used to send the authentication token to the SBC 1606. In various embodiments, the insertion of the token in the header is done by JavaScript web application 1614, which was sent by Web App 1608 to the client device 1602. The SBC 1606 includes one or more modules to recover the call authorization token and perform verification of the recovered token. In some embodiments, the Browser 1610 of the client device 1602 also sends the random value it generated as another piece of information in the SIP message. Any header or parameter, e.g., in a SIP or other signal, can be used for this purpose, e.g., with the meaning of the header information or parameter predetermined and known to the systems and/or devices using the header or parameter.

SBC 1606 has access to the secret key. The SBC 1606 decrypts the authorization info. It verifies that the random value in the decrypted value matches the random value sent in unencrypted form. If there is not a match between the decrypted value and to random value sent in unencrypted form the packet is just dropped/or call rejected. Assuming successful verification of the encrypted random value, then time information, e.g., a token lifetime, is verified against current time to make sure the token is still valid. If the token is within a configurable amount of seconds, e.g., a set lifetime, the token is accepted and call setup is allowed to proceed. If the token has expired, the current time does not match the valid time period of the token, the packet or SIP signal used to initiate the call is dropped/or the call attempt is rejected.

In some embodiments an authorization token includes only encrypted information while in other embodiments the authorization token includes encrypted information and some unencrypted information, e.g., some or all information used in generate the encrypted information. In embodiments where the token does not include all the unencrypted information used as an input to an encryption process used to generated the encrypted portion of the token, security is enhanced since an entity intercepting the communication in only one direction of the communication from the web browser, e.g., running on a client device such as a personal computer or a cell phone, to the web server or from the web server to the web browser will lack the the full set of material, e.g., encrypted token content and unencrypted input used to generate the encrypted content, which is to be supplied to a session border controller. In some embodiments where the authorization token includes only encrypted content or includes encrypted content plus, in unencrypted form, a portion of the input used to generate the encrypted content, the web browser using the token supplies the unencrypted content used as input to generate the encrypted portion of the token, or portion thereof not included in the token, to a session border controller or other device which uses the authorization token in making a decision whether or not to allow a call to proceed. The web browser may, and sometimes does, supply the unencrypted content to a session border control in the same signal, e.g., message, in which an authorization token is provided of the session border controller, but in other embodiments the unencrypted information used to generate the encrypted portion of the token is supplied in a separate signal sent by the web browser to the session border controller where the separate signal sent to the session border controller is different from the signal used to send the authorization token to the session border controller.

In various embodiments, a policer is allocated in the SBC 1606 on a per encrypted value basis. This policer limits the number/rate of calls, which can be done by using a particular encrypted value. For example, this policer can be used in a way where each encrypted value can be used only once. This policer is deleted after a configurable amount of time.

In one alternative approach SIP signaling is off the Web App, e.g., implemented on the Web Application server rather than directly from a user's browser. The disadvantage there is the extra burden on the Web Application as it needs to deal with call setup/tear down and with all complexities associated with SIP signaling. This introduces both complexity in functionality and also non-negligible performance penalty due to handling of SIP signaling.

Various steps, features, and/or aspects of the present invention can be implemented in a Web App, JavaScript, a client device, a web browser, a web page server, and/or a a session border controller (SBC) such as a SBC including a media proxy. Various described methods and/or apparatus are well suited for RTCWeb based scenarios, where legacy SIP world is accessed via SIP off the JavaScript in browser. Various described methods, features and/or aspects can be, and sometimes are used in a Web App, a JavaScript supplied by Web App., and/or a SBC. Various described methods and apparatus are well suited for RTCWeb deployments accessing legacy SIP world.

The techniques of various embodiments may be implemented using software, hardware and/or a combination of software and hardware. Various embodiments are directed to apparatus, e.g., communications device such as client devices including a web browser, session border controllers, e.g., a session border controller including a media proxy, media proxies, web servers, e.g., web page servers, web RTC servers, call servers, phones, etc. Various embodiments are also directed to methods, e.g., a method of operating a communications device such as a client device including a web browser, a method of operating a session border controller such as a session border controller including a media proxy, a method of operating a web server such as a web page server, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal generation, signal transmission, signal reception, signal processing, and/or other steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to an apparatus, e.g., a communications device such as a client device including a web browser or a session border controller (SBC) including a media proxy or a web server such as a web page server, including a processor configured to implement one, multiple or all of the steps of one or more methods of the invention.

In some embodiments, the processor or processors, e.g., CPUs, of one or more devices, e.g., of the communications device or session border controller or web server, are configured to perform the steps of the methods described as being performed by the apparatus. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., such as communications device or session border controller or web server, with a processor which includes a module corresponding to each of the steps of the various described methods performed by the device in which the processor is included. In some but not all embodiments an apparatus, e.g., a communications device or session border controller or web server, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or a session border controller or a web server. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a client device, the method comprising:
   detecting, by the client device, user input indicating selection of a call initiation option corresponding to a web page used to initiate a call to a party;
   sending, by the client device, a request for a call authorization token to a web server;
   receiving, by the client device, an issued call authorization token from said web server, said call authorization token including information encrypted by the web server using a key known to the web server and a Session Border Controller and authorizing the Session Border Controller to establish a call between the client device and a called party device, said encrypted information including a token number; and
   sending, by the client device, a signal to initiate a call to said Session Border Controller, said signal being an invite message including information identifying the party to which said call is directed and said issued call authorization token.

2. The method of claim 1 further comprising:
   generating said token number; and
   including said token number in said request for a call authorization token.

3. The method of claim 1, wherein said token number is a random number.

4. The method of claim 3, wherein said issued call authorization token includes only encrypted information.

5. The method of claim 3, wherein said issued call authorization token includes at least some encrypted information and additional information, said additional information being unencrypted and being some but not all of the information used to generate the encrypted information.

6. The method of claim 5, wherein said encrypted information is generated based on a signal from said client device.

7. The method of claim 5, further comprising:
receiving, by the client device, a request for user input from said web server; and
wherein said signal from said client device includes a message providing information entered by a user of said client device in response to a request for user input.

8. The method of claim 7, wherein said request for user input is a request that the user enter text corresponding to a phrase supplied by said web server.

9. The method of claim 1,
wherein said client device, said web server, and said Session Border Controller are separate devices; and
wherein said client device is a smartphone coupled to said web server via a wireless communications link.

10. A communications device including a processor configured to control the communications device to:
detect user input indicating selection of a call initiation option corresponding to a web page used to initiate a call to a party;
send a request for a call authorization token to a web server;
receive an issued call authorization token from said web server, said call authorization token including information encrypted by the web server using a key known to the web server and a Session Border Controller and authorizing the Session Border Controller to establish a call between the communications device and a called party device, said encrypted information including a token number; and
send a signal to initiate a call, said signal being an invite message including information identifying the party to which said call is directed and said issued call authorization token.

11. The communications device of claim 10, wherein said token number is a random number.

12. The communications device of 10, wherein said issued call authorization token includes at least some encrypted information and additional information, said additional information being unencrypted and being some but not all of the information used to generate the encrypted information.

13. A method of operating a web server, the method comprising:
receiving a request for a call authorization token from a client device executing a web browser in response to user selection of an initiate call web page option presented to a user in a web page;
determining whether or not to issue a call authorization token in response to said request;
when it is determined that a call authorization token is to be issued,
i) generating, using encryption and a key known to a Session Border Controller and said web server, the call authorization token, said call authorization token including a token number and authorizing the Session Border Controller to establish a call between the client device and a called party device; and ii) sending the generated call authorization token to said client device for use in establishing a call with a called party.

14. The method of claim 13, further comprising:
prior to receiving the request for a call authorization token, transmitting the web page to the client device, said web page including a JavaScript providing said call initiate option which when activated by a user of said web browser triggers the web browser to send said request for a call authorization token.

15. The method of 13, wherein determining whether or not to issue a call authorization token includes:
determining if said request for a call authorization token corresponds to a known customer of a business to which said web page corresponds based on information included in said request, said request including a customer identifier or an identifier identifying the client device from which said request was sent.

16. The method of claim 15, wherein determining whether or not to issue a call authorization token includes determining to issue said call authorization token when it is determined the request for a call authorization token corresponds to the known customer of the business to which the web page corresponds.

17. The method of 16, wherein determining whether or not to issue a call authorization token includes, when it is determined that the request for a call authorization token did not come from a known customer:
sending a request for user input to the client device; and
making a decision whether or not to issue the call authorization token based on user input received from said client device.

18. A web server including a processor configured to control said web server to:
receive a request for a call authorization token from a client device executing a web browser in response to a user selection of an initiate call web page option presented to a user in a web page;
determine whether or not to issue a call authorization token in response to said request;
generate, using encryption and a key known to a Session Border Controller and said web server, the call authorization token, when it is determined that a call authorization token is to be issued, said call authorization token including a token number and authorizing the Session Border Controller to establish a call between the client device and a called party device; and
send the generated call authorization token to said client device for use in establishing a call with a called party.

19. The web server of 18, wherein said processor is further configured to control said web server to:
transmit the web page to the client device, said web page including a JavaScript providing the call initiate option which when activated by a user of said web browser triggers the web browser to send said request for a call authorization token.

20. The web server of claim 19, wherein said to determine whether or not to issue a call authorization token includes:
determining if said request for a call authorization token corresponds to a known customer of a business to which said web page corresponds based on information included in said request, said request including a customer identifier or an identifier identifying the client device from which said request was sent.

* * * * *